US012794580B2

(12) United States Patent
Han

(10) Patent No.: US 12,794,580 B2
(45) Date of Patent: Nov. 10, 2026

(54) CLOCK SYNCHRONIZATION INFORMATION OBTAINING (OR PROVIDING) METHOD AND COMMUNICATION APPARATUS

(71) Applicant: HUAWEI TECHNOLOGIES CO., LTD., Shenzhen (CN)

(72) Inventor: Xi Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 18/632,320

(22) Filed: Apr. 11, 2024

(65) Prior Publication Data

US 2024/0259127 A1 Aug. 1, 2024

Related U.S. Application Data

(63) Continuation of application No. PCT/CN2022/139228, filed on Dec. 15, 2022.

(30) Foreign Application Priority Data

Dec. 28, 2021 (CN) ......................... 202111633141.3

(51) Int. Cl.
*H04J 3/06* (2006.01)
*H04W 56/00* (2009.01)

(52) U.S. Cl.
CPC .......... *H04J 3/0644* (2013.01); *H04J 3/0658* (2013.01); *H04W 56/0015* (2013.01)

(58) Field of Classification Search
CPC .. H04B 1/7073; H04B 1/7087; H04B 1/7156; H04B 1/7183; H04B 7/18589;
(Continued)

(56) References Cited

U.S. PATENT DOCUMENTS 9,270,395 B2 2/2016 Zheng et al.
11,388,779 B2 * 7/2022 Fu ......................... H04W 80/08
(Continued)

FOREIGN PATENT DOCUMENTS

CN 110784275 A 2/2020
CN 114501604 A 5/2022
(Continued)

OTHER PUBLICATIONS

IEEE Std 1588™—2008,IEEE Standard for a Precision Clock Synchronization Protocol for Networked Measurement and Control Systems,Jul. 24, 2008,total 289 pages.

*Primary Examiner* — Frank Duong

(57) ABSTRACT

This application discloses a clock synchronization information obtaining (or providing) method and a communication apparatus, which are applied to a communication network between a radio device controller and a radio device. The radio device can provide, based on clock synchronization information, the radio device controller with clock synchronization accuracy of the radio device relative to a clock source, and the radio device controller can determine, based on the clock synchronization information, clock synchronization accuracy (that is, first clock synchronization accuracy) of the radio device relative to the radio device controller.

20 Claims, 4 Drawing Sheets

(58) Field of Classification Search
CPC ................... H04B 7/19; H04B 7/2125; H04B 2201/7073; H04J 3/0623; H04J 3/0632; H04J 3/0635; H04J 3/0638; H04J 3/0644; H04J 3/0647; H04J 3/0652; H04J 3/0658; H04J 3/0673; H04J 3/0685; H04J 3/0691; H04J 3/0694; H04J 3/0697; H04L 7/0008; H04L 25/247; H04W 56/0005; H04W 56/001; H04W 56/0015; H04W 56/002; H04W 56/0025; H04W 56/003; H04W 56/0035; H04W 56/004; H04W 56/0045; H04W 56/005; H04W 56/0055; H04W 56/006; H04W 56/0065; H04W 56/007; H04W 56/0075; H04W 56/008; H04W 56/0085; H04W 56/009; H04W 56/0095
See application file for complete search history.

(56) References Cited

U.S. PATENT DOCUMENTS

| | | | | |
|---|---|---|---|---|
| 11,985,615 | B2 * | 5/2024 | Fertonani | H04W 56/0015 |
| 12,250,651 | B2 * | 3/2025 | Lindqvist | H04W 56/0015 |
| 2016/0073365 | A1 | 3/2016 | Klockar | |
| 2020/0413360 | A1 | 12/2020 | Ruffini et al. | |
| 2021/0153151 | A1 * | 5/2021 | Yin | H04W 56/005 |
| 2024/0031049 | A1 * | 1/2024 | Liu | H04J 3/0638 |

FOREIGN PATENT DOCUMENTS

| | | | |
|---|---|---|---|
| JP | 2021051652 | A | 4/2021 |
| WO | 2017130034 | A1 | 8/2017 |
| WO | 2021152353 | A1 | 8/2021 |

* cited by examiner

CLOCK SYNCHRONIZATION INFORMATION OBTAINING (OR PROVIDING) METHOD AND COMMUNICATION APPARATUS

CROSS-REFERENCE TO RELATED APPLICATIONS

This application is a continuation of International Application No. PCT/CN2022/139228, filed on Dec. 15, 2022, which claims priority to Chinese Patent Application No. 202111633141.3, filed on Dec. 28, 2021. The disclosures of the aforementioned applications are hereby incorporated by reference in their entireties.

TECHNICAL FIELD

Embodiments of this application relate to the communication field, and in particular, to a clock synchronization information obtaining (or providing) method and a communication apparatus.

BACKGROUND

In a front-haul transport network, a radio device controller is communicatively connected to a radio device through a front-haul transport interface. When the radio device controller is directly connected to the radio device, in other words, no other network device exists between the radio device controller and the radio device, the radio device controller can obtain clock synchronization accuracy of the radio device relative to the radio device controller. When two radio devices have a requirement for performing a service in collaboration, the radio device controller can determine, based on clock synchronization accuracy of each radio device, whether the service can be completed in collaboration.

However, in the front-haul transport network, the radio device controller is not necessarily directly connected to the radio device. The radio device controller may be connected to the radio device by using one or more transmission devices. In this case, the radio device controller cannot learn of a clock synchronization accuracy of the radio device. Therefore, the radio device controller may be affected in determining whether the radio device runs a specific service.

SUMMARY

This application provides a clock synchronization information obtaining (or providing) method and a communication apparatus, so that a radio device controller learns of clock synchronization accuracy of a radio device relative to the radio device controller, to help the radio device controller determine whether to trigger a service of the radio device.

According to a first aspect, this application provides a clock synchronization information obtaining method. The method relates to a radio device controller and a radio device. The radio device controller can receive clock synchronization information from a radio device, where the clock synchronization information indicates clock synchronization accuracy between the radio device and a clock source. Then, the radio device controller can determine first clock synchronization accuracy based on the clock synchronization information, where the first clock synchronization accuracy is clock synchronization accuracy between the radio device and the radio device controller.

The clock synchronization accuracy refers to a fluctuation range of a difference between time (or a phase) of a measured clock and time (or a phase) of a reference clock. Usually, the clock synchronization accuracy may be represented by an average error value of time (or a phase) of the measured clock and time (or a phase) of the reference clock within a test metric. In this application, the clock synchronization accuracy is a fluctuation range of a difference between the radio device and a specific transmission device or a specific radio device controller in terms of time or a phase. It should be noted that, in some embodiments, the clock synchronization accuracy may also be referred to as synchronization accuracy or time synchronization accuracy.

That the clock synchronization information indicates the clock synchronization accuracy between the radio device and the clock source may be understood as that, the clock synchronization information is information for determining the clock synchronization accuracy between the radio device and the clock source. The radio device controller can determine the clock synchronization accuracy between the radio device and the clock source based on the clock synchronization information.

The clock source is a network device that provides a reference time clock for a clock link on which the radio device is located, and the clock link is a link for clock synchronization between the clock source and the radio device; and the reference time clock is a final reference for performing clock synchronization or clock calibration.

In a conventional technology, a radio device controller cannot learn which clock synchronization link is used by a radio device to perform synchronization, and cannot learn which network device is a clock source on a clock link on which the radio device performs clock accuracy of the radio device relative to the radio device controller, and further, the radio device controller cannot manage some services of the radio device based on the clock synchronization accuracy.

However, in this application, the radio device can provide, based on the clock synchronization information, the radio device controller with the clock synchronization accuracy of the radio device relative to the clock source, and the radio device controller can determine, based on the clock synchronization information, the clock synchronization accuracy (that is, the first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

It should be noted that, the radio device may be connected to the radio device controller through at least one clock information transmission device, or the radio device may be directly connected to the radio device controller.

The clock information transmission device is a device configured to transmit information (referred to as clock information below) related to clock synchronization, and the clock information may include a part or all of the clock synchronization information. Usually, the at least one clock information transmission device is for connection.

It should be understood that, no matter which manner is used by the radio device to connect to the radio device controller, the radio device controller may receive the clock synchronization information from the radio device.

In a possible implementation, the clock synchronization information includes an identity of the clock source and an identity of a source port, and the identity of the source port indicates an upper-level network device that is on the clock link and that provides clock synchronization for the radio device.

The identity of the clock source indicates the network device that provides the reference time clock for the clock link on which the radio device is located. The clock source is the network device that provides the reference time clock for the clock link on which the radio device is located. The reference time clock is a final reference for performing clock synchronization or clock calibration. Each device (including a transmission device and a radio device) on the clock link directly or indirectly uses a system clock of the clock source as a clock synchronization reference. The clock link is a link for clock synchronization between the clock source and the radio device.

It should be understood that the clock source in the clock synchronization information sent by the radio device to the radio device controller may be the radio device controller that receives the clock synchronization information, where in this case, the radio device and the radio device controller are located on a same clock synchronization link; may be a radio device controller on another clock link, where in this case, the radio device may perform clock synchronization through another clock link, and the clock link does not include the radio device controller that receives the clock synchronization information; or may be a network device that can provide a clock as a reference and that is on another link or topology. This is not specifically limited herein.

The identity of the source port indicates an upper-level network device that provides clock synchronization for the radio device on the clock link. The upper-level network device is a network device directly connected to the radio device, and the radio device directly performs clock synchronization based on the network device. Specifically, the upper-level network device may be a transmission device connected to the radio device, or may be the radio device controller.

Optionally, the clock synchronization information further includes second clock synchronization accuracy, and the second clock synchronization accuracy is clock synchronization accuracy of the radio device relative to the upper-level network device.

The second clock synchronization accuracy is the clock synchronization accuracy of the radio device relative to the upper-level network device, that is, a fluctuation range of a difference between time (or a phase) of a system clock of the radio device and time (or a phase) of a system clock of the upper-level network device. For example, if the upper-level network device is a transmission device directly connected to the radio device, the second clock synchronization accuracy is clock synchronization accuracy of the radio device relative to the transmission device; or if the upper-level network device is the radio device controller directly connected to the radio device, the second clock synchronization accuracy is the clock synchronization accuracy of the radio device relative to the radio device controller.

Optionally, the clock synchronization information further includes an identifier of the radio device. The identifier of the radio device is for making clear, to the radio device controller, an identity of the radio device that sends the clock synchronization information, so that the radio device controller can determine, based on the identifier of the radio device, the radio device from which the clock synchronization information comes. When the radio device controller communicates with a plurality of radio devices, the identifier of the radio device can distinguish the radio device that sends the clock synchronization information from other radio devices.

In a possible implementation, when the clock synchronization information includes the identity of the clock source, the identity of the source port, and the second clock synchronization accuracy, a process in which the radio device controller determines the first clock synchronization accuracy based on the clock synchronization information may be specifically: When the identity of the clock source is the same as the identifier of the radio device controller, and the identity of the clock source is the same as the identity of the source port, the radio device controller determines that the second clock synchronization accuracy is the first clock synchronization accuracy.

In this implementation, the identity of the clock source is the same as the identifier of the radio device controller, and the identity of the clock source is the same as the identity of the source port. Therefore, the radio device controller may determine that the radio device is directly connected to the radio device controller, that is, the radio device directly performs clock synchronization based on the clock source. Further, the radio device controller can determine that the second clock synchronization accuracy carried in the clock synchronization information represents the clock synchronization accuracy (that is, the first clock synchronization accuracy) of the radio device relative to the radio device controller. Therefore, the radio device controller uses a value of the second clock synchronization accuracy in the clock synchronization information as a value of the first clock synchronization accuracy.

Optionally, the clock synchronization information further includes information about a quantity of communication channels on the clock link, and the communication channel is a channel between two directly connected network devices that can transmit clock information.

The clock information is information related to clock synchronization, and content of the clock information may include a part or all of the clock synchronization information.

In a possible implementation, when the clock synchronization information includes the identity of the clock source, the identity of the source port, the second clock synchronization accuracy, and the information about the quantity of the communication channels, a process in which the radio device controller determines the first clock synchronization accuracy based on the clock synchronization information includes: When the identity of the clock source is the same as the identifier of the radio device controller, and the identity of the clock source is different from the identity of the source port, the radio device controller determines the first clock synchronization accuracy based on the information about the quantity of the communication channels, the second clock synchronization accuracy, and preset clock synchronization accuracy.

If the identity of the clock source is different from the identity of the source port, it indicates that the upper-level network device of the radio device and the clock source are not a same device, and the radio device is connected to the clock source through at least one transmission device. The at least one transmission device includes the upper-level network device of the radio device. In this case, the second clock synchronization accuracy indicates clock synchronization accuracy of the radio device relative to the upper-level network device that provides clock synchronization for the radio device. However, the second clock synchronization accuracy cannot reflect the clock synchronization accuracy of the radio device relative to the clock source. In this case, the radio device controller needs to determine a topology of the clock link between the radio device and the radio device controller based on the information about the quantity of the communication channels, to estimate the clock synchronization accuracy (that is, the first clock synchronization accuracy) between the radio device and the radio device controller based on the preset clock synchronization accuracy and the second clock synchronization accuracy.

In a possible implementation, that the radio device controller determines the first clock synchronization accuracy based on the information about the quantity of the communication channels, the second clock synchronization accuracy, and preset clock synchronization accuracy includes: The radio device controller determines a product obtained by multiplying the preset clock synchronization accuracy by a difference between the quantity of the communication channels and 1; and the radio device controller determines that a sum of the product and the second clock synchronization accuracy is the first clock synchronization accuracy.

The preset clock synchronization accuracy may be clock synchronization accuracy between two network devices predefined in a protocol or a standard, or may be an empirical value that is manually set in the radio device controller, indicating a possible value of clock synchronization accuracy between two network devices on the clock link. It should be understood that, in addition to being for estimating clock synchronization accuracy between two transmission devices, the preset clock synchronization accuracy may be further for estimating clock synchronization accuracy of a transmission device relative to a radio device controller directly connected to the transmission device.

Because the information about the quantity of the communication channels can reflect how many levels of clock synchronization need to be performed between the radio device and the radio device controller, if the radio device controller can estimate clock synchronization accuracy (referred to as clock synchronization accuracy of each level) between two network devices connected by each communication channel, the radio device controller may use an accumulated sum of synchronization accuracy of clock synchronization of each level as the clock synchronization accuracy (that is, the first clock synchronization accuracy) between the radio device and the radio device controller.

For example, because the preset clock synchronization accuracy can be for estimating clock synchronization accuracy of each level of clock synchronization between the upper-level network device of the radio device and the radio device controller, and the second clock synchronization accuracy can be for determining the clock synchronization accuracy of the radio device relative to the upper-level network device of the radio device, the radio device controller may use the product obtained by multiplying the preset clock synchronization accuracy by the difference between the quantity of the communication channels and 1 as the clock synchronization accuracy between the upper-level network device of the radio device and the radio device controller. Then, the radio device controller uses the sum of the product and the second clock synchronization accuracy as the first clock synchronization accuracy.

In this embodiment, if the radio device controller cannot directly obtain the clock synchronization accuracy of the radio device relative to the radio device controller, the radio device controller can deduce the topology of the clock link between the radio device and the radio device controller based on the information about the quantity of the communication channels, and then determine the first clock synchronization accuracy based on the topology of the clock link, the preset clock synchronization accuracy, and the second clock synchronization accuracy. Compared with a solution in which the radio device controller estimates the first clock synchronization accuracy when the radio device controller cannot learn of the topology of the clock link, this implementation helps ensure an accuracy rate of estimating the first clock synchronization accuracy by the radio device controller, and helps the radio device controller make a more accurate and reasonable decision for a service of the radio device.

In a possible implementation, the clock synchronization information includes an identity of the clock source and third clock synchronization accuracy, and the third clock synchronization accuracy is the clock synchronization accuracy of the radio device relative to the clock source.

Optionally, the clock synchronization information further includes an identifier of the radio device. The identifier of the radio device is for making clear, to the radio device controller, an identity of the radio device that sends the clock synchronization information, so that the radio device controller can determine, based on the identifier of the radio device, the radio device from which the clock synchronization information comes. When the radio device controller communicates with a plurality of radio devices, the identifier of the radio device can distinguish the radio device that sends the clock synchronization information from other radio devices.

In a possible implementation, that the radio device controller determines the first clock synchronization accuracy based on the clock synchronization information includes: When the identity of the clock source is the same as an identifier of the radio device controller, the radio device controller determines that the third clock synchronization accuracy is the first clock synchronization accuracy.

In this implementation, if the radio device can obtain the clock synchronization accuracy (that is, the third clock synchronization accuracy) of the radio device relative to the clock source from a front-haul transport network, the radio device may provide the third clock synchronization accuracy for the radio device controller. If the clock source is the radio device controller that receives the clock synchronization information, a value of the third clock synchronization accuracy represents the clock synchronization accuracy (that is, the first clock synchronization accuracy) of the radio device relative to the radio device controller. Therefore, when the identity of the clock source is the same as the identifier of the radio device controller, the radio device controller determines that the third clock synchronization accuracy is the first clock synchronization accuracy.

In a possible implementation, the clock synchronization information is carried in a management message.

The management message may be a management message that is for clock management and that is between the radio device and the radio device controller, or may be a management message that is for managing another service or function and that is between the radio device and the radio device controller. This is not specifically limited herein. The management message may implement point-to-point transmission from the radio device to the radio device controller. Therefore, that the clock synchronization information is carried in the management message helps implement accurate information transmission, helps avoid a signaling storm, and helps reduce a network transmission load.

In a possible implementation, the clock synchronization information is transmitted to the radio device controller in a unicast manner.

In this implementation, the clock synchronization information may be carried in a message that can be directly sent by the radio device to the radio device controller in a unicast manner. For example, the radio device may send the clock synchronization information to the radio device controller in an internet protocol (IP) packet unicast manner. Compared with a multicast or broadcast transmission manner, this helps avoid a signaling storm and reduce a network transmission load.

In a possible implementation, the method further includes: The radio device controller sends the clock synchronization information of the radio device and/or the first clock synchronization accuracy to a network management device.

In this implementation, the radio device controller may send only the clock synchronization information of the radio device to the network management device, may send only the first clock synchronization accuracy to the network management device, or may send both the clock synchronization information and the first clock synchronization accuracy to the network management device. Therefore, the network management device may determine the clock link between the radio device and the radio device controller based on the clock synchronization information. If the network management device receives clock synchronization information of a plurality of radio devices, the network management device may determine a clock topology formed by a plurality of clock links. This helps the network management device manage, based on the clock links (or clock topology), a transmission device in the front-haul transport network or the radio device and the radio device controller that are connected by using the front-haul transport network, and helps improve management efficiency of managing the transmission device, the radio device, or the radio device controller by the network device.

In a possible implementation, the radio device includes a first radio device and a second radio device. The radio device controller determines fourth clock synchronization accuracy based on clock synchronization information received from the first radio device, where the fourth clock synchronization accuracy is clock synchronization accuracy between the first radio device and the radio device controller. The radio device controller determines fifth clock synchronization accuracy based on clock synchronization information received from the second radio device, where the fifth clock synchronization accuracy is clock synchronization accuracy between the second radio device and the radio device controller. Then, the method further includes:

The radio device controller determines sixth clock synchronization accuracy based on the fourth clock synchronization accuracy and the fifth clock synchronization accuracy, where the sixth clock synchronization accuracy is clock synchronization accuracy between the first radio device and the second radio device; and the radio device controller determines, based on the sixth clock synchronization accuracy, whether the first radio device and the second radio device are allowed to run a first service in collaboration, where the first service is a service on which a collaboration operation needs to be performed by two or more radio devices.

For example, the first service may be a service related to a multiple-input multiple-output (MIMO) technology, a service related to carrier aggregation (CA), or the like. This is not limited in this application.

In a possible implementation, that the radio device controller determines sixth clock synchronization accuracy based on the fourth clock synchronization accuracy and the fifth clock synchronization accuracy may be specifically: The radio device controller calculates a sum of the fourth clock synchronization accuracy and the fifth clock synchronization accuracy, to obtain the sixth clock synchronization accuracy.

In a possible implementation, that the radio device controller determines, based on the sixth clock synchronization accuracy, whether the first radio device and the second radio device are allowed to run a first service in collaboration may be specifically:

When the sixth clock synchronization accuracy is less than clock synchronization accuracy corresponding to the first service, the radio device controller determines to allow the first radio device and the second radio device to run the first service in collaboration; and when the sixth clock synchronization accuracy is greater than the clock synchronization accuracy corresponding to the first service, the radio device controller determines not to allow the first radio device and the second radio device to run the first service in collaboration.

The clock synchronization accuracy corresponding to the first service may be understood as a maximum time (or phase) deviation that can be tolerated by the first service. When clock synchronization accuracy between two radio devices is less than the clock synchronization accuracy corresponding to the first service, it may be understood that a time (or phase) deviation between the two radio devices does not affect running of the first service. When clock synchronization accuracy between two radio devices is greater than the clock synchronization accuracy corresponding to the first service, it may be understood that a time (or phase) deviation between the two radio devices is large, and may affect running of the first service. Therefore, in this case, it is not recommended that the first radio device and the second radio device run the first service in collaboration.

According to a second aspect, this application provides a clock synchronization information providing method. The method relates to a radio device controller and a radio device. The radio device sends clock synchronization information to the radio device controller, where the clock synchronization information indicates clock synchronization accuracy between the radio device and a clock source, the clock synchronization information is for determining first clock synchronization accuracy, and the first clock synchronization accuracy is clock synchronization accuracy between the radio device and the radio device controller.

The clock synchronization accuracy refers to a fluctuation range of a difference between time (or a phase) of a measured clock and time (or a phase) of a reference clock. Usually, the clock synchronization accuracy may be represented by an average error value of time (or a phase) of the measured clock and time (or a phase) of the reference clock within a test metric. In this application, the clock synchronization accuracy is a fluctuation range of a difference between the radio device and a specific transmission device or a specific radio device controller in terms of time or a phase. It should be noted that, in some embodiments, the clock synchronization accuracy may also be referred to as synchronization accuracy or time synchronization accuracy.

That the clock synchronization information indicates the clock synchronization accuracy between the radio device and the clock source may be understood as that, the clock synchronization information is information for determining the clock synchronization accuracy between the radio device and the clock source. The radio device controller can determine the clock synchronization accuracy between the radio device and the clock source based on the clock synchronization information.

The clock source is a network device that provides a reference time clock for a clock link on which the radio device is located, and the clock link is a link for clock synchronization between the clock source and the radio device; and the reference time clock is a final reference for performing clock synchronization or clock calibration.

In this application, the radio device can provide, based on the clock synchronization information, the radio device controller with the clock synchronization accuracy of the radio device relative to the clock source, and the radio device controller can determine, based on the clock synchronization information, the clock synchronization accuracy (that is, first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

It should be noted that, the radio device may be connected to the radio device controller through at least one clock information transmission device, or the radio device may be directly connected to the radio device controller.

In a possible implementation, the clock synchronization information includes an identity of the clock source and an identity of a source port, and the identity of the source port indicates an upper-level network device that is on the clock link and that provides clock synchronization for the radio device.

The identity of the source port indicates an upper-level network device that provides clock synchronization for the radio device on the clock link. The upper-level network device is a network device directly connected to the radio device, and the radio device directly performs clock synchronization based on the network device. Specifically, the upper-level network device may be a transmission device connected to the radio device, or may be the radio device controller.

Optionally, the clock synchronization information further includes second clock synchronization accuracy, and the second clock synchronization accuracy is clock synchronization accuracy of the radio device relative to the upper-level network device of the radio device.

The second clock synchronization accuracy is the clock synchronization accuracy of the radio device relative to the upper-level network device, that is, a fluctuation range of a difference between time (or a phase) of a system clock of the radio device and time (or a phase) of a system clock of the upper-level network device. For example, if the upper-level network device is a transmission device directly connected to the radio device, the second clock synchronization accuracy is clock synchronization accuracy of the radio device relative to the transmission device; or if the upper-level network device is the radio device controller directly connected to the radio device, the second clock synchronization accuracy is the clock synchronization accuracy of the radio device relative to the radio device controller.

In a possible implementation, the clock synchronization information further includes information about a quantity of communication channels on the clock link, and the communication channel is a channel between two network devices that can transmit clock information.

In a possible implementation, the clock synchronization information includes an identity of the clock source and third clock synchronization accuracy, and the third clock synchronization accuracy is the clock synchronization accuracy of the radio device relative to the clock source.

In a possible implementation, the clock synchronization information is carried in a management message.

In a possible implementation, the clock synchronization information is transmitted to the radio device controller in a unicast manner.

In a possible implementation, the clock synchronization information further includes an identifier of the radio device. The identifier of the radio device is for making clear, to the radio device controller, an identity of the radio device that sends the clock synchronization information, so that the radio device controller can determine, based on the identifier of the radio device, the radio device from which the clock synchronization information comes. When the radio device controller communicates with a plurality of radio devices, the identifier of the radio device can distinguish the radio device that sends the clock synchronization information from other radio devices.

It should be noted that, there are a plurality of other implementations in this embodiment of this application. For details, refer to the specific implementations of the first aspect and beneficial effects of the first aspect. Details are not described herein again.

According to a third aspect, this application provides a radio device controller, where the radio device controller includes a transceiver module and a processing module. The transceiver module is configured to receive clock synchronization information from a radio device, where the clock synchronization information indicates clock synchronization accuracy between the radio device and a clock source, the clock source is a network device that provides a reference time clock for a clock link on which the radio device is located, and the clock link is a link for clock synchronization between the clock source and the radio device. The processing module is configured to determine first clock synchronization accuracy based on the clock synchronization information, where the first clock synchronization accuracy is clock synchronization accuracy between the radio device and the radio device controller.

Optionally, the radio device is connected to the radio device controller through at least one clock information transmission device, or the radio device is directly connected to the radio device controller.

Optionally, the clock synchronization information is carried in a management message.

Optionally, the clock synchronization information is transmitted to the radio device controller in a unicast manner.

In a possible implementation, the clock synchronization information includes an identity of the clock source, an identity of a source port, and second clock synchronization accuracy. The identity of the source port indicates an upper-level network device that is on the clock link and that provides clock synchronization for the radio device. The second clock synchronization accuracy is clock synchronization accuracy of the radio device relative to the upper-level network device.

Optionally, the clock synchronization information further includes an identifier of the radio device.

In a possible implementation, the processing module is specifically configured to: when the identity of the clock source is the same as an identifier of the radio device controller, and the identity of the clock source is the same as the identity of the source port, determine that the second clock synchronization accuracy is the first clock synchronization accuracy.

Optionally, the clock synchronization information further includes information about a quantity of communication channels on the clock link, and the communication channel is a channel between two directly connected network devices that can transmit clock information.

In a possible implementation, the processing module is specifically configured to: when the identity of the clock source is the same as an identifier of the radio device controller, and the identity of the clock source is different from the identity of the source port, determine the first clock synchronization accuracy based on the information about the quantity of the communication channels, the second clock synchronization accuracy, and preset clock synchronization accuracy.

In a possible implementation, the processing module is specifically configured to: determine a product obtained by multiplying the preset clock synchronization accuracy by a difference between the quantity of the communication channels and 1. The radio device controller determines that a sum of the product and the second clock synchronization accuracy is the first clock synchronization accuracy.

In another possible implementation, the clock synchronization information includes an identity of the clock source and third clock synchronization accuracy, and the third clock synchronization accuracy is the clock synchronization accuracy of the radio device relative to the clock source.

Optionally, the clock synchronization information further includes an identifier of the radio device.

In a possible implementation, the processing module is specifically configured to: when the identity of the clock source is the same as an identifier of the radio device controller, determine that the third clock synchronization accuracy is the first clock synchronization accuracy.

In a possible implementation, the transceiver module is further configured to send the clock synchronization information of the radio device and/or the first clock synchronization accuracy to a network management device.

In a possible implementation, the radio device includes a first radio device and a second radio device, clock synchronization accuracy between the first radio device and the radio device controller is fourth clock synchronization accuracy, and clock synchronization accuracy between the second radio device and the radio device controller is fifth clock synchronization accuracy.

The processing module is further configured to:
- determine sixth clock synchronization accuracy based on the fourth clock synchronization accuracy and the fifth clock synchronization accuracy, where the sixth clock synchronization accuracy is clock synchronization accuracy between the first radio device and the second radio device; and
- determine, based on the sixth clock synchronization accuracy, whether the first radio device and the second radio device are allowed to run a first service in collaboration, where the first service is a service on which a collaboration operation needs to be performed by two or more radio devices.

It should be noted that, there are a plurality of other implementations in this embodiment of this application. For details, refer to the specific implementations of the first aspect and beneficial effects of the first aspect. Details are not described herein again.

According to a fourth aspect, this application provides a radio device, where the radio device includes a transceiver module and a processing module. The processing module is configured to generate clock synchronization information, where the clock synchronization information indicates clock synchronization accuracy between the radio device and a clock source, the clock source is a network device that provides a reference time clock for a clock link on which the radio device is located, and the clock link is a link for clock synchronization between the clock source and the radio device. The transceiver module is configured to send the clock synchronization information to a radio device controller, where the clock synchronization information is for determining first clock synchronization accuracy, and the first clock synchronization accuracy is clock synchronization accuracy between the radio device and the radio device controller.

Optionally, the radio device is connected to the radio device controller through at least one clock information transmission device, or the radio device is directly connected to the radio device controller.

Optionally, the clock synchronization information is carried in a management message.

Optionally, the clock synchronization information is transmitted to the radio device controller in a unicast manner.

In a possible implementation, the clock synchronization information includes an identity of the clock source, an identity of a source port, and second clock synchronization accuracy. The identity of the source port indicates an upper-level network device that is on the clock link and that provides clock synchronization for the radio device. The second clock synchronization accuracy is clock synchronization accuracy of the radio device relative to the upper-level network device of the radio device.

Optionally, the clock synchronization information further includes information about a quantity of communication channels on the clock link, and the communication channel is a channel between two directly connected network devices that can transmit clock information.

In another possible implementation, the clock synchronization information includes an identity of the clock source and third clock synchronization accuracy, and the third clock synchronization accuracy is the clock synchronization accuracy of the radio device relative to the clock source.

It should be noted that, there are a plurality of other implementations in this embodiment of this application. For details, refer to the specific implementations of the second aspect and beneficial effects of the second aspect. Details are not described herein again.

According to a fifth aspect, an embodiment of this application provides a communication apparatus. The communication apparatus may be the radio device controller in the foregoing implementations, or may be a chip or a functional module in the radio device controller. The communication apparatus may include a processing module and a transceiver module. When the communication apparatus is the radio device controller, the processing module may be a processor, and the transceiver module may be a transceiver. The radio device controller may further include a storage module, and the storage module may be a memory. The storage module is configured to store instructions. The processing module executes the instructions stored in the storage module, so that the radio device controller performs the method according to any one of the first aspect or the implementations of the first aspect. When the communication apparatus is the chip in the radio device controller, the processing module may be a processor, and the transceiver module may be an input/output interface, a pin, a circuit, or the like. The processing module executes instructions stored in a storage module, so that the radio device controller performs the method according to any one of the first aspect or the implementations of the first aspect. The storage module may be a storage module (for example, a register or a buffer) in the chip, or may be a storage module (for example, a read-only memory or a random access memory) that is in the radio device controller and that is located outside the chip.

According to a sixth aspect, an embodiment of this application provides a communication apparatus. The communication apparatus may be the radio device in the foregoing implementations, or may be a chip or a functional module in the radio device. The communication apparatus may include a processing module and a transceiver module. When the communication apparatus is the radio device, the processing module may be a processor, and the transceiver module may be a transceiver. The radio device may further include a storage module, and the storage module may be a memory. The storage module is configured to store instructions. The processing module executes the instructions stored in the storage module, so that the radio device performs the method according to any one of the second aspect or the implementations of the second aspect. When the communication apparatus is the chip in the radio device, the processing module may be a processor, and the transceiver module may be an input/output interface, a pin, a circuit, or the like. The processing module executes instructions stored in a storage module, so that the radio device performs the method according to any one of the second aspect or the implementations of the second aspect. The storage module may be a storage module (for example, a register or a buffer) in the chip, or may be a storage module (for example, a read-only memory or a random access memory) that is in the radio device and that is located outside the chip.

According to a seventh aspect, this application provides a communication apparatus. The apparatus may be an integrated circuit chip. The integrated circuit chip includes a processor. The processor is coupled to a memory. The memory is configured to store a program or instructions. When the program or the instructions are executed by the processor, the communication apparatus is enabled to perform the method according to any one of the first aspect or the implementations of the first aspect, or perform the method according to any one of the second aspect or the implementations of the second aspect.

According to an eighth aspect, an embodiment of this application provides a computer program product including instructions. When the computer program product runs on a computer, the computer is enabled to perform the method according to any one of the first aspect, the second aspect, or the implementations of the foregoing aspects.

According to a ninth aspect, an embodiment of this application provides a computer-readable storage medium, including instructions. When the instructions are run on a computer, the computer is enabled to perform the method according to any one of the first aspect, the second aspect, or the implementations of the foregoing aspects.

According to a tenth aspect, an embodiment of this application provides a communication system. The communication system includes the radio device controller according to any one of the third aspect and the implementations of the third aspect, and the radio device according to any one of the fourth aspect and the implementations of the fourth aspect.

BRIEF DESCRIPTION OF DRAWINGS

To describe technical solutions in embodiments of this application more clearly, the following briefly describes accompanying drawings for describing the embodiments. It is clear that the accompanying drawings in the following description show merely some embodiments of this application.

DESCRIPTION OF EMBODIMENTS

Figure 1:
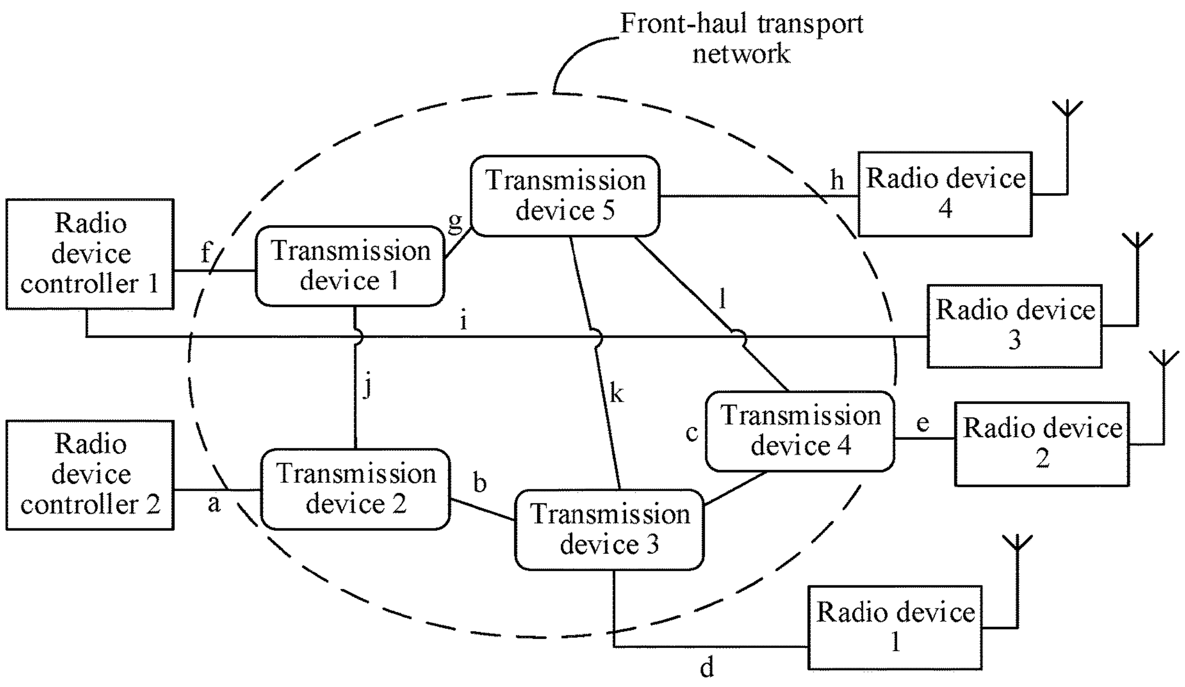
FIG. 1 is an example diagram of a front-haul transport network according to this application.

The following clearly describes the technical solutions in embodiments of this application with reference to the accompanying drawings in embodiments of this application. It is clear that the described embodiments are merely some but not all of embodiments of this application.

In the specification, claims, and accompanying drawings of this application, the terms “first”, “second”, “third”, “fourth”, and the like (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms “include” and “have” and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

For ease of understanding, the following first explains some terms in this application.

Clock synchronization: A slave clock adjusts time (or a phase) of the slave clock based on a master clock (also referred to as a parent clock (parent clock)), so that a time (or phase) deviation between the slave clock and the master clock is kept within a small error range. It should be understood that a master clock and a slave clock in clock synchronization are a pair of relative concepts. For example, device A performs clock synchronization based on device B, and device B performs clock synchronization based on device C. In this case, for device A, device B is a master clock, and device A is a slave clock; for device C, device C is a master clock, and device B is a slave clock.

Clock synchronization accuracy refers to a fluctuation range of a difference between time (or a phase) of a measured clock and time (or a phase) of a reference clock. Usually, the clock synchronization accuracy may be represented by an average error value of time (or a phase) of the measured clock and time (or a phase) of the reference clock within a test metric. For example, if the clock synchronization accuracy of the measured clock is 50 ns, it indicates that the difference between the time (or phase) of the measured clock and the time (or phase) of the reference clock fluctuates within 50 ns. In some embodiments, the clock synchronization accuracy may also be referred to as synchronization accuracy or time synchronization accuracy. It should be understood that the reference clock may be a master clock of the measured clock, may be a clock source of the measured clock, or may be another clock. This is not specifically limited herein. In this application, the clock synchronization accuracy is a fluctuation range of a difference between the radio device and a specific transmission device or a specific radio device controller in terms of time or a phase.

A clock source (grandmaster clock) is a device that provides a reference time clock for a network device in a specific range (for example, a network device on a clock link). The reference time clock is a final reference for clock synchronization or clock calibration. Each device (for example, a transmission device and a radio device that are to be described below) on the clock link directly or indirectly uses the clock source as a reference for clock synchronization, that is, a tracing source for clock synchronization performed by a device on the clock link is the clock source.

A clock link is a link formed by connecting in series a plurality of devices that perform clock synchronization level by level. A source of the clock link is a clock source, and the clock link may connect a plurality of devices (for example, the transmission device and the radio device that are to be described below). The clock link in this application is mainly a clock link formed by directly connecting a radio device controller and a radio device through an optical fiber, or a clock link formed by connecting a radio device controller and a radio device through at least one transmission device.

For ease of understanding, the following first describes a system architecture and an application scenario of a clock synchronization information obtaining method provided in this application.

The clock synchronization information obtaining method provided in this application is mainly applied to a network in which a radio device and a radio device controller perform clock synchronization. The network in which the radio device and the radio device controller perform clock synchronization may be a 4th generation mobile communication technology (4G) network, a 5th generation mobile communication technology (5G) network, or a 6th generation mobile communication technology (6G) network, and may even be applicable to a future communication network. This is not specifically limited herein.

For example, the network in which the radio device and the radio device controller perform clock synchronization may be a fronthaul front-haul transport network (FTN). It should be understood that, with development of communication technologies, the network in which the radio device and the radio device controller perform clock synchronization may alternatively be another network, or another name is used. This is not specifically limited herein. This application is described by using a front-haul transport network as an example.

In this application, the network in which the radio device and the radio device controller perform clock synchronization may be a front-haul transport network in a 4G long term evolution (LTE) system, a front-haul transport network in a 5G new radio (NR) system, a front-haul transport network in a 6G system, or even a front-haul transport network in a subsequent evolved standard. A network standard to which the clock synchronization information obtaining method is applicable and a network name are not limited in this application.

The front-haul transport network in this application is mainly configured to connect the radio device and the radio device controller. The front-haul transport network includes one or more transmission devices, and a transmission medium (for example, an optical fiber or a cable) that connects the transmission devices. The radio device controller may be directly connected to the radio device through the transmission medium in the front-haul transport network, or the radio device controller may be connected to the radio device through the one or more transmission devices in the front-haul transport network.

The radio device controller may be a network element or a device having a baseband signal processing function, or a device having a function of managing radio signal processing of a radio access network (RAN). The radio device controller can complete baseband signal processing functions such as coding, multiplexing, modulation, and spreading, can complete a function of processing signaling from the radio device, can implement a function of performing local management and remote operation and maintenance on the radio device, and can provide a function of clock synchronization for the transmission device or the radio device. For example, the radio device controller may be a baseband unit (BBU) (also referred to as a building baseband unit (BBU)) in an access network device (for example, a base station). For example, in a long term evolution LTE system or an LTE-advanced (LTE-A) system, the radio device controller may be a baseband unit BBU in an evolved NodeB (eNB or e-NodeB). For another example, in a 5G NR system, the radio device controller may be a baseband unit BBU in a next generation NodeB (gNB). For example, in the 5G NR system, the radio device controller may be a distributed unit (DU) in a cloud radio access network (Cloud-RAN) or an open radio access network (ORAN) system, may be a central unit (CU), or may be a combination structure of a central unit CU and a distributed unit DU. In actual application and subsequent network evolution, the radio device controller may alternatively be another device or apparatus having a baseband signal processing function, or another device or apparatus having a function of managing radio signal processing of a radio access network RAN.

It should be understood that, when different communication protocols are used by the radio device controller and the radio device, the radio device controller may have different names. For example, in the common public radio interface (CPRI) protocol, the radio device controller is referred to as a radio equipment control (REC). In the enhanced common public radio interface (eCPRI) protocol, the radio device controller is referred to as an eCPRI radio equipment control (eREC). In another protocol that provides communication for a baseband unit and a radio frequency unit, the radio device controller may also have another name. Specifically, a specific implementation form of the radio device controller is not limited in this application, and is described by using the term “radio device controller” below.

In addition, the radio device may be a radio unit (RU) (also referred to as a radio frequency unit) in a radio access network RAN device (for example, a base station), or may be another processing apparatus having a function of processing a radio signal (for example, an intermediate frequency signal or a radio frequency signal). For example, the radio device may be a remote radio unit (RRU) (also referred to as a remote radio frequency unit) or a remote radio head (RRH) in a base station. The RRU is usually for conventional outdoor coverage of a macro base station, and the RRH is usually for indoor coverage of an indoor distributed system. For example, the radio device may alternatively be an active antenna unit (AAU), that is, a processing unit that integrates an RRU (or an RRH) and an antenna. In an actual application and subsequent network evolution, the radio device may alternatively be another device or apparatus that has functions of receiving and sending a radio frequency signal and processing a radio frequency signal or an intermediate frequency signal.

It should be understood that some physical layer functions of the baseband unit may be deployed on the radio frequency unit. In this case, the radio device may have some physical layer functions of the BBU, for example, functions such as modulation, demodulation, layer mapping, fast Fourier transform (FFT), and channel estimation/equalization.

It should be understood that, when different communication protocols are used by the radio device controller and the radio device, the radio device may have different names. In the common public radio interface (CPRI) protocol, the radio device is referred to as a radio equipment (RE). In the enhanced common public radio interface (eCPRI) protocol, the radio device is referred to as an eCPRI radio equipment (eRE). In another protocol that provides communication for a baseband unit and a radio frequency unit, the radio device may also have another name. Specifically, a specific implementation form of the radio device is not limited in this application, and is described by using the term "radio device" below.

In addition, the transmission device is a network device that is in the front-haul transport network and that is configured to transmit information related to clock synchronization (or time synchronization) (referred to as clock information for short below). Therefore, the transmission device may also be referred to as a clock information transmission device. For example, the transmission device may be a transmission equipment (TE) having a boundary clock (BC) function, for example, a network device that can implement clock information transmission, such as a packet transport network (PTN) device, a router, a switch, a microwave device, and an optical transport network (OTN) device. In actual application and subsequent network evolution, the transmission device may alternatively be another device or apparatus that has a clock synchronization function or a clock information transmission function. Specifically, a specific implementation form of the transmission device is not limited in this application, and is described by using the term "transmission device" below.

In the foregoing front-haul transport network, the radio device controller is communicatively connected to the radio device through a front-haul transport interface, and performs clock synchronization according to a clock synchronization protocol. For example, the front-haul transport interface may be an enhanced common public radio interface (eCPRI), or may be another interface that provides a communication function for the radio device and the radio device controller. This is not specifically limited herein. The clock synchronization protocol may be the precision time protocol (PTP) (also referred to as the IEEE 1588 protocol), or may be another protocol in which clock synchronization is performed in a level-by-level synchronization manner. This is not specifically limited herein.

Specifically, when the radio device controller is directly connected to the radio device, the radio device performs clock synchronization based on the radio device controller. When the radio device controller is connected to the radio device through another transmission device, the radio device is synchronized to the radio device controller in a level-by-level synchronization manner based on the transmission device connected to the radio device.

For ease of understanding, using FIG. 1 as an example, radio device 1, radio device 2, radio device 3, and radio device 4 are connected to radio device controller 1 and radio device controller 2 via a front-haul transport network. Radio device controller 1 is directly connected to radio device 3, and radio device controller 1 may be connected to radio device 4 through transmission device 1 and transmission device 5 in the front-haul transport network, may be connected to radio device 2 through transmission device 1, transmission device 5, and transmission device 4 in the front-haul transport network, and may be connected to radio device 1 through transmission device 1, transmission device 2, and transmission device 3 in the front-haul transport network. Similarly, the radio device controller 2 may be connected to one or more radio devices in FIG. 1 through one or more transmission devices in FIG. 1. Details are not listed herein.

At a specific moment, a radio device performs clock synchronization with a radio device controller through a clock link, and the radio device can obtain clock synchronization accuracy of an upper-level network device directly connected to the radio device. For example, at a moment, if transmission device 1 performs clock synchronization based on a system clock of radio device controller 1, then transmission device 5 performs clock synchronization based on a system clock of transmission device 1, and finally radio device 4 performs clock synchronization based on a system clock of transmission device 5, a clock link of radio device 4 is "f-g-h". After completing the foregoing clock synchronization, radio device 4 can obtain clock synchronization accuracy relative to an upper-level network device (that is, transmission device 5) of radio device 4. For another example, at a moment, if transmission device 2 performs clock synchronization based on a system clock of radio device controller 2, next, transmission device 3 performs clock synchronization based on a system clock of transmission device 2, then transmission device 5 performs clock synchronization based on a system clock of transmission device 3, and finally radio device 4 performs clock synchronization based on a system clock of transmission device 5, a clock link of radio device 4 is "a-b-k-h". After completing the foregoing clock synchronization, radio device 4 can obtain clock synchronization accuracy relative to an upper-level network device (that is, transmission device 5) of radio device 4.

In addition, if the radio device controller is directly connected to the radio device, the radio device performs clock synchronization based only on the radio device controller. For example, radio device 3 is directly connected to radio device controller 1 through an optical fiber. Radio device 3 may directly perform clock synchronization based on a system clock of radio device controller 1, that is, radio device 3 serves as a slave clock and radio device controller 1 serves as a master clock to perform clock synchronization, and a clock link of radio device 3 is "i". After completing clock synchronization, radio device 3 can obtain clock synchronization accuracy relative to an upper-level network device (that is, radio device controller 1) of radio device 3.

As shown in the foregoing example, because clock synchronization accuracy of the radio device relative to the radio device controller is related to the front-haul transport network, clock synchronization accuracy of a same radio device relative to clock sources on different clock links is different. Because a management plane and a clock synchronization plane between the radio device and the radio device controller are not completely the same, for example, radio device controller 1 provides a clock synchronization reference for radio device 2 through a clock link “f-g-l-e”, but radio device 2 may need to exchange data or signaling with radio device controller 2. Therefore, for radio device controller 2, radio device controller 2 may not be able to learn of clock synchronization accuracy of radio device 2 relative to radio device controller 2. A service (for example, a service related to multiple-input multiple-output (MIMO) technology, or a service related to carrier aggregation (CA)) that needs to be cooperatively operated between two or more radio devices has a specific requirement on clock synchronization accuracy. Therefore, when a cooperatively operated service is related to two radio devices managed by the radio device controller, service triggering may be affected because the radio device controller cannot learn of clock synchronization accuracy between the two radio devices.

Therefore, in the clock synchronization information obtaining method provided in this application, the radio device can provide, for the radio device controller, information (that is, clock synchronization information described below) for determining clock synchronization accuracy of the radio device relative to a device, so that the radio device controller can determine, based on the clock synchronization information, clock synchronization accuracy of the radio device relative to the radio device controller. Further, the radio device controller can accurately determine clock synchronization accuracy between two radio devices, and the radio device controller can determine whether the two radio devices run a service that requires a collaborative operation.

Figure 2:
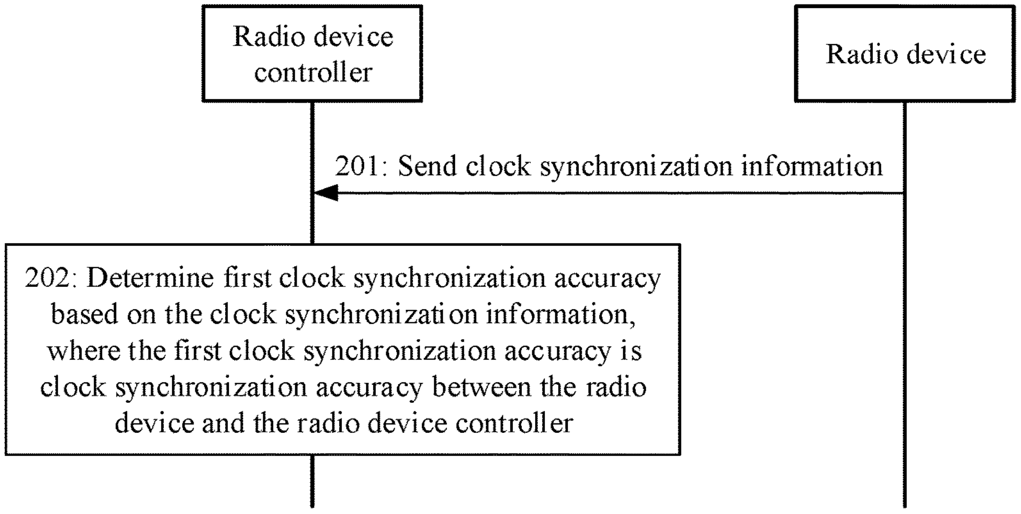
FIG. 2 is a flowchart of a clock synchronization information obtaining method according to this application.

With reference to FIG. 2, the following describes a main procedure of the clock synchronization information obtaining method provided in this application. A radio device and a radio device controller perform the following steps.

Step 201: The radio device sends clock synchronization information to the radio device controller. Correspondingly, the radio device controller receives the clock synchronization information from the radio device.

The clock synchronization information indicates clock synchronization accuracy between the radio device and a clock source, which may be understood as that the clock synchronization information is information for determining the clock synchronization accuracy between the radio device and the clock source. The radio device controller can determine the clock synchronization accuracy, that is, a fluctuation range of a difference between time (or a phase) of a system clock of the radio device and time (or a phase) of a system clock of the clock source, between the radio device and the clock source based on the clock synchronization information received from the radio device.

The clock source is a device that provides a reference time clock for a clock link on which the radio device is located. The reference time clock is a final reference for performing clock synchronization or clock calibration. Each device (including a transmission device and a radio device) on the clock link directly or indirectly uses the system clock of the clock source as a clock synchronization reference. The clock link is a link for clock synchronization between the clock source and the radio device.

FIG. 1 is used as an example. If transmission device 2 performs clock synchronization based on radio device controller 2, transmission device 3 performs clock synchronization based on transmission device 2, and radio device 1 performs clock synchronization based on transmission device 3, “a-b-d” forms a clock link. Because transmission device 2 directly uses radio device controller 2 as a reference for clock synchronization, and transmission device 3 and radio device 1 indirectly use radio device controller 2 as a reference for clock synchronization, the radio device controller 2 is a clock source of the clock link “a-b-d”. For another example, if transmission device 1 performs clock synchronization based on radio device controller 1, transmission device 2 performs clock synchronization based on transmission device 1, transmission device 3 performs clock synchronization based on transmission device 2, and radio device 1 performs clock synchronization based on transmission device 3, “f-j-b-d” forms a clock link. Because transmission device 1 directly uses radio device controller 1 as a reference for clock synchronization, and transmission device 2, transmission device 3, and radio device 1 indirectly use radio device controller 1 as a reference for clock synchronization, radio device controller 1 is a clock source of the clock link “f-j-b-d”. For another example, if radio device 3 directly performs clock synchronization based on radio device controller 1, a clock link between radio device 3 and radio device controller 1 is “i”, and radio device controller 1 is a clock source of the clock link “i”. It should be understood that, in addition to the foregoing examples, the clock source may alternatively be another device that provides a reference for clock synchronization for the foregoing clock link. This is not specifically listed herein.

It should be understood that the clock source in the clock synchronization information sent by the radio device to the radio device controller may be the radio device controller that receives the clock synchronization information, where in this case, the radio device and the radio device controller are located on a same clock synchronization link; may be a radio device controller on another clock link, where in this case, the radio device may perform clock synchronization through another clock link, and the clock link does not include the radio device controller that receives the clock synchronization information; or may be a network device that can provide a clock as a reference and that is on another link or topology. This is not specifically limited herein. Therefore, before the radio device controller that receives the clock synchronization information parses the clock synchronization information, the radio device controller does not know whether the radio device and the radio device controller that receives the clock synchronization information are located on a same clock link, and does not know which clock source and which clock link are used by the radio device to perform clock synchronization. After the radio device controller parses the clock synchronization information, the radio device controller can determine which clock source and which clock link are used by the radio device to perform clock synchronization.

The following describes specific content included in the clock synchronization information.

In a possible implementation, the clock synchronization information includes an identity of the clock source, an identity of a source port, and second clock synchronization accuracy.

The identity of the clock source indicates the device that provides the reference time clock for the clock link on which the radio device is located. Specifically, refer to the foregoing descriptions of the clock source. Details are not described herein again. For example, the identity of the clock source may be a grandmaster clock identity (grandmasterIdentity) in the precision time protocol PTP. It should be understood that, in another clock synchronization protocol, the clock source and the identity of the clock source may also be referred to as other terms. This is not specifically limited herein.

The identity of the source port indicates an upper-level network device that is on the clock link and that provides clock synchronization for the radio device. The upper-level network device is a network device directly connected to the radio device, and the radio device directly performs clock synchronization based on the network device. Specifically, the upper-level network device may be a transmission device connected to the radio device, or may be the radio device controller. FIG. 1 is used as an example. For example, if the radio device that sends the clock synchronization information is radio device 1, an upper-level network device of radio device 1 is transmission device 3, and the identity of the source port is an identity of transmission device 3. For another example, if the radio device that sends the clock synchronization information is radio device 2, an upper-level network device of radio device 2 is transmission device 4, and the identity of the source port is an identity of transmission device 4. For another example, if the radio device that sends the clock synchronization information is radio device 3, an upper-level network device of radio device 3 is radio device controller 1, and the identity of the source port is an identity of radio device controller 1. For example, the identity of the source port may be sourcePortIdentity in the precision time protocol PTP. It should be understood that, in another clock synchronization protocol, the source port and the identity of the source port may also be referred to as other terms. This is not specifically limited herein.

In addition, the second clock synchronization accuracy is clock synchronization accuracy of the radio device relative to the upper-level network device of the radio device, that is, a fluctuation range of a difference between time (or a phase) of a system clock of the radio device and time (or a phase) of a system clock of the upper-level network device of the radio device. For example, if the upper-level network device of the radio device is a transmission device directly connected to the radio device, the second clock synchronization accuracy is clock synchronization accuracy of the radio device relative to the transmission device; or if the upper-level network device of the radio device is a radio device controller directly connected to the radio device, the second clock synchronization accuracy is clock synchronization accuracy of the radio device relative to the radio device controller. For example, the second clock synchronization accuracy may be referred to as local accuracy. It should be understood that, in another clock synchronization protocol, clock synchronization accuracy of a network device relative to an upper-level network device of the network device may also be referred to as another term. This is not specifically limited herein.

Optionally, the clock synchronization information further includes information about a quantity of communication channels on the clock link, and the communication channel is a channel between two directly connected network devices that can transmit clock information. Optionally, the information about the quantity of the communication channels can indicate the quantity of the communication channels. The clock information may be information related to an operation such as clock synchronization or clock calibration. Optionally, the clock information includes a part or all of the clock synchronization information. In addition, a device capable of transmitting the clock information may be a radio device controller on the clock link, where the radio device controller can send the clock information to a transmission device connected to the radio device controller. Alternatively, the device capable of transmitting the clock information may be a transmission device on the clock link, where the transmission device can send the clock information to a connected transmission device or a connected radio device. Alternatively, the device capable of transmitting the clock information may be a radio device, where the radio device can send the clock information to a connected transmission device. For example, when a clock synchronization protocol adopted by the radio device and the radio device controller is for calculating a communication channel, counting starts from 0. To be specific, when there are three communication channels on the clock link between the radio device and the radio device controller, a value recorded by a counter in a network device is 2. In this case, the information about the quantity of the communication channels may be represented by the value on the counter in the network device plus 1. For example, in the precision time protocol PTP, the information about the quantity of the communication channels may be represented by a value of stepsRemoved plus 1. For example, when a clock synchronization protocol adopted by the radio device and the radio device controller is for calculating a communication channel, counting starts from 1. To be specific, when there are three communication channels on the clock link between the radio device and the radio device controller, a value recorded by a counter in a network device is 3. In this case, the information about the quantity of the communication channels may be directly represented by the value on the counter in the network device.

FIG. 1 is used as an example. For example, if radio device controller 2, transmission device 2, transmission device 3, and radio device 1 may form a clock link (referred to as clock link 1), communication channels on clock link 1 include communication channel a between radio device controller 2 and transmission device 2, communication channel b between transmission device 2 and transmission device 3, and communication channel d between transmission device 3 and radio device 1. In this case, a quantity of the communication channels on the clock link is 3, indicating that three communication channels exist between radio device 1 and a clock source (that is, radio device controller 2) on the clock link. For another example, if radio device controller 1, transmission device 1, transmission device 2, transmission device 3, and radio device 1 may form a clock link (referred to as clock link 2), communication channels on clock link 2 include communication channel f between radio device controller 1 and transmission device 1, communication channel j between transmission device 1 and transmission device 2, communication channel b between transmission device 2 and transmission device 3, and communication channel d between transmission device 3 and radio device 1. In this case, a quantity of the communication channels on clock link 2 is 4, indicating that four communication channels exist between radio device 1 and a clock source (that is, radio device controller 1) on the clock link.

Optionally, the clock synchronization information further includes an identifier of the radio device. The identifier of the radio device is for making clear, to the radio device controller, an identity of the radio device that sends the clock synchronization information, so that the radio device controller can determine, based on the identifier of the radio device, the radio device from which the clock synchronization information comes. When the radio device controller communicates with a plurality of radio devices, the identifier of the radio device can distinguish the radio device that sends the clock synchronization information from other radio devices. For example, in the precision time protocol PTP, a clock identity (clockIdentity) may be for identifying the radio device.

It should be noted that, if the clock synchronization information does not include the identifier of the radio device, signaling that is sent by the radio device to the radio device controller and that carries the clock synchronization information may carry the identifier of the radio device. In this case, the identifier of the radio device does not belong to the clock synchronization information, but the identifier of the radio device can also make clear indicate, to the radio device controller, the identity of the radio device that sends the clock synchronization information. In this case, the identifier of the radio device may be an internet protocol (IP) address of the radio device or a media access control (MAC) address of the radio device, or may be other information that can identify the identity of the radio device. This is not specifically limited herein.

In another possible implementation, the clock synchronization information includes an identity of the clock source and third clock synchronization accuracy.

The identity of the clock source indicates the device that provides the reference time clock for the clock link on which the radio device is located. Specifically, for the identity of the clock source, refer to related descriptions in the foregoing implementation. Details are not described herein again.

In addition, the third clock synchronization accuracy is the clock synchronization accuracy of the radio device relative to the clock source, that is, a fluctuation range of a difference between time (or a phase) of a system clock of the radio device and time (or a phase) of the system clock of the clock source. For example, the third clock synchronization accuracy may be referred to as total accuracy. It should be understood that, in another clock synchronization protocol, clock synchronization accuracy of a network device relative to a clock source on a clock link on which the network device is located may also be referred to as another term. This is not specifically limited herein.

Optionally, the clock synchronization information further includes an identifier of the radio device. In this implementation, a function and an implementation form of the identifier of the radio device are similar to those of the identifier of the radio device in the foregoing implementation. For details, refer to the foregoing related descriptions. Details are not described herein again.

In addition, the clock synchronization information in this application may be carried in a message that can be directly sent by the radio device to the radio device controller in a unicast manner. For example, the radio device may send the clock synchronization information to the radio device controller in an IP packet unicast manner. Compared with a multicast or broadcast transmission manner, this helps avoid a signaling storm and reduce a network transmission load.

Optionally, because a management message for clock management between the radio device and the radio device controller may implement point-to-point transmission from the radio device to the radio device controller, the clock synchronization information may be carried in the management message between the radio device and the radio device controller. For example, the management message may be a management packet in the 1588 protocol.

Step 202: The radio device controller determines first clock synchronization accuracy based on the clock synchronization information, where the first clock synchronization accuracy is clock synchronization accuracy between the radio device and the radio device controller.

The first clock synchronization accuracy is clock synchronization accuracy between the radio device that sends the clock synchronization information and the radio device controller that receives the clock synchronization information, that is, a fluctuation range of a difference between the time (or the phase) of the system clock of the radio device and time (or a phase) of a system clock of the radio device controller.

Specifically, if content of the clock synchronization information received by the radio device controller is different, implementations of determining the first clock synchronization accuracy by the radio device controller are also different.

In a possible implementation, the clock synchronization information includes the identity of the clock source and the identity of the source port. Optionally, the clock synchronization information further includes the second clock synchronization accuracy, and the second clock synchronization accuracy is the clock synchronization accuracy of the radio device relative to the upper-level network device of the radio device.

Specifically, the radio device controller determines a relationship among the identity of the clock source, an identifier of the radio device controller, and the identity of the source port, and determines, based on the relationship among the foregoing three parameters (that is, the identity of the clock source, the identifier of the radio device controller, and the identity of the source port), how to determine the first clock synchronization accuracy.

In an implementation, when the identity of the clock source is the same as the identifier of the radio device controller, and the identity of the clock source is the same as the identity of the source port, the radio device controller determines that the second clock synchronization accuracy is the first clock synchronization accuracy. It may also be understood as that the radio device controller uses a value of the second clock synchronization accuracy in the clock synchronization information as a value of the first clock synchronization accuracy.

The identity of the clock source is the same as the identifier of the radio device controller, indicating that a clock source traced by the radio device level by level is the radio device controller that receives the clock synchronization information, instead of a clock source of another clock link. It may also be understood that a reference for clock synchronization of the radio device is the radio device controller that receives the clock synchronization information. In this case, the radio device controller can calculate the clock synchronization accuracy (that is, the first clock synchronization accuracy) between the radio device and the radio device controller based on the clock synchronization information, and does not need to obtain other information about clock synchronization from another clock source or another radio device controller.

If the identity of the clock source is the same as the identity of the source port, it indicates that the upper-level network device of the radio device and the clock source are a same device. In other words, the radio device is directly connected to the clock source, that is, the radio device directly performs clock synchronization based on the clock source. In this case, the second clock synchronization accuracy indicates the clock synchronization accuracy of the radio device relative to the clock source.

In addition, the identity of the clock source is the same as the identifier of the radio device controller, and the identity of the clock source is the same as the identity of the source port. Therefore, the radio device controller may determine that the radio device is directly connected to the radio device controller, that is, the radio device directly performs clock synchronization based on the clock source. Further, the radio device controller can determine that the second clock synchronization accuracy carried in the clock synchronization information represents the clock synchronization accuracy (that is, the first clock synchronization accuracy) of the radio device relative to the radio device controller. Therefore, the radio device controller uses a value of the second clock synchronization accuracy in the clock synchronization information as a value of the first clock synchronization accuracy.

In another implementation, when the identity of the clock source is the same as the identifier of the radio device controller, and the identity of the clock source is different from the identity of the source port, the radio device controller determines the first clock synchronization accuracy based on the information about the quantity of the communication channels, the second clock synchronization accuracy, and preset clock synchronization accuracy.

If the identity of the clock source is different from the identity of the source port, it indicates that the upper-level network device of the radio device and the clock source are not a same device, and the radio device is connected to the clock source through at least one transmission device. The at least one transmission device includes the upper-level network device of the radio device. In this case, the second clock synchronization accuracy indicates clock synchronization accuracy of the radio device relative to the upper-level network device that provides clock synchronization for the radio device. However, the second clock synchronization accuracy cannot reflect the clock synchronization accuracy of the radio device relative to the clock source.

In this case, the radio device controller needs to determine a topology of the clock link between the radio device and the radio device controller based on the information about the quantity of the communication channels, to estimate the clock synchronization accuracy (that is, the first clock synchronization accuracy) between the radio device and the radio device controller. The information about the quantity of the communication channels can reflect how many levels of clock synchronization need to be performed between the radio device and the radio device controller. If the radio device controller can estimate clock synchronization accuracy (referred to as clock synchronization accuracy of each level) between two network devices connected by each communication channel, the radio device controller may use an accumulated sum of synchronization accuracy of clock synchronization of each level as the clock synchronization accuracy (that is, the first clock synchronization accuracy) between the radio device and the radio device controller.

Optionally, the radio device controller stores the preset clock synchronization accuracy. The preset clock synchronization accuracy may be clock synchronization accuracy between two network devices that is predefined in a protocol or a standard. For example, ITU-T G.8273.2 defines synchronization accuracy of a hop of a boundary clock BC device, where class A: 100 ns, class B: 70 ns, class C: 30 ns, and class D: 5 ns. In addition, the preset clock synchronization accuracy may alternatively be an empirical value that is manually set in the radio device controller, indicating a possible value of clock synchronization accuracy between two network devices on the clock link.

For example, because the preset clock synchronization accuracy can be for estimating clock synchronization accuracy of each level of clock synchronization between the upper-level network device of the radio device and the radio device controller, and the second clock synchronization accuracy can be for determining the clock synchronization accuracy of the radio device relative to the upper-level network device of the radio device, the radio device controller may use the product obtained by multiplying the preset clock synchronization accuracy by the difference between the quantity of the communication channels and 1 as the clock synchronization accuracy between the upper-level network device of the radio device and the radio device controller. Then, the radio device controller uses the sum of the product and the second clock synchronization accuracy as the first clock synchronization accuracy.

In this implementation, if the radio device controller cannot directly obtain the clock synchronization accuracy of the radio device relative to the radio device controller, the radio device controller can deduce the topology of the clock link between the radio device and the radio device controller based on the information about the quantity of the communication channels, and then determine the first clock synchronization accuracy based on the topology of the clock link, the second clock synchronization accuracy, and the preset clock synchronization accuracy. Compared with a solution in which the radio device controller estimates the first clock synchronization accuracy when the radio device controller cannot learn of the topology of the clock link, this implementation helps ensure an accuracy rate of estimating the first clock synchronization accuracy by the radio device controller, and helps the radio device controller make a more accurate and reasonable decision for a service of the radio device.

In this implementation, a front-haul transport network provides only the clock synchronization accuracy (that is, the second clock synchronization accuracy) between the radio device and the upper-level network device (that is, the upper-level network device that provides clock synchronization for the radio device) of the radio device for the radio device. Therefore, the radio device can provide the clock synchronization accuracy (that is, the second clock synchronization accuracy) between the radio device and the upper-level network device of the radio device for the radio device controller. If the upper-level network device of the radio device is the radio device controller, the second clock synchronization accuracy also represents the first clock synchronization accuracy. If the upper-level network device of the radio device is not the radio device controller, the radio device controller further needs to determine the first clock synchronization accuracy based on other parameters (for example, the preset clock synchronization accuracy and the information about the quantity of the communication channels). Regardless of which implementation is used, the radio device controller may determine the first clock synchronization accuracy based on the received clock synchronization information. In this way, the radio device controller can determine, based on the first clock synchronization accuracy, whether to allow the radio device to trigger a service.

In another possible implementation, the clock synchronization information includes an identity of the clock source and third clock synchronization accuracy, and the third clock synchronization accuracy is the clock synchronization accuracy of the radio device relative to the clock source.

In this implementation, the radio device can provide the radio device controller with the clock synchronization accuracy of the radio device relative to the clock source, that is, the third clock synchronization accuracy. If the clock source is the radio device controller that receives the clock synchronization information, a value of the third clock synchronization accuracy represents the clock synchronization accuracy (that is, the first clock synchronization accuracy) of the radio device relative to the radio device controller. Therefore, when the identity of the clock source is the same as the identifier of the radio device controller, the radio device controller determines that the third clock synchronization accuracy is the first clock synchronization accuracy.

In this implementation, because a front-haul transport network may provide the radio device with the clock synchronization accuracy between the radio device and the clock source on the clock link, the radio device can provide the radio device controller with the clock synchronization accuracy of the radio device relative to the clock source, that is, the third clock synchronization accuracy. If the clock source and the radio device controller are a same device, the third clock synchronization accuracy carried in the clock synchronization information is the first clock synchronization accuracy. Therefore, when the identity of the clock source is the same as the identifier of the radio device controller, the radio device controller can determine the first clock synchronization accuracy based on the received clock synchronization information. In this way, the radio device controller can determine, based on the first clock synchronization accuracy, whether to allow the radio device to trigger a service.

Optionally, if the radio device controller needs to determine whether two or more radio devices are allowed to execute a service that requires a collaborative operation, the radio device controller may determine clock synchronization accuracy between the two or more radio devices based on clock synchronization accuracy of each of the foregoing radio devices relative to the radio device controller.

For example, if the radio device controller receives clock synchronization information from a first radio device and clock synchronization information from a second radio device, the radio device controller determines fourth clock synchronization accuracy based on the clock synchronization information received from the first radio device, and the radio device controller determines fifth clock synchronization accuracy based on the clock synchronization information received from the second radio device. The fourth clock synchronization accuracy is clock synchronization accuracy between the first radio device and the radio device controller, and the fifth clock synchronization accuracy is clock synchronization accuracy between the second radio device and the radio device controller.

Then, the radio device controller determines sixth clock synchronization accuracy based on the fourth clock synchronization accuracy and the fifth clock synchronization accuracy, where the sixth clock synchronization accuracy is clock synchronization accuracy between the first radio device and the second radio device. Then, the radio device controller determines, based on the sixth clock synchronization accuracy, whether the first radio device and the second radio device are allowed to run a first service in collaboration, where the first service is a service on which a collaboration operation needs to be performed by two or more radio devices. For example, the first service may be a service related to a multiple-input multiple-output (MIMO) technology, a service related to carrier aggregation (CA), or the like. A specific type of the first service is not limited in this application.

For example, that the radio device controller determines sixth clock synchronization accuracy based on the fourth clock synchronization accuracy and the fifth clock synchronization accuracy may be: The radio device controller calculates a sum of the fourth clock synchronization accuracy and the fifth clock synchronization accuracy, to obtain the sixth clock synchronization accuracy.

When the sixth clock synchronization accuracy is less than clock synchronization accuracy corresponding to the first service, the radio device controller determines to allow the first radio device and the second radio device to run the first service in collaboration; and when the sixth clock synchronization accuracy is greater than the clock synchronization accuracy corresponding to the first service, the radio device controller determines not to allow the first radio device and the second radio device to run the first service in collaboration.

The clock synchronization accuracy corresponding to the first service may be understood as a maximum time (or phase) deviation that can be tolerated by the first service. When clock synchronization accuracy between two radio devices is less than the clock synchronization accuracy corresponding to the first service, it may be understood that a time (or phase) deviation between the two radio devices does not affect running of the first service. When clock synchronization accuracy between two radio devices is greater than the clock synchronization accuracy corresponding to the first service, it may be understood that a time (or phase) deviation between the two radio devices is large, and may affect running of the first service. Therefore, in this case, it is not recommended that the first radio device and the second radio device run the first service in collaboration.

In a conventional technology, a radio device controller cannot learn which clock synchronization link is used by a radio device to perform synchronization, and cannot learn which network device is a clock source on a clock link on which the radio device performs clock synchronization. Therefore, the radio device controller cannot learn of clock synchronization accuracy of the radio device relative to the radio device controller, and further, the radio device controller cannot manage some services of the radio device based on the clock synchronization accuracy.

In this application, the radio device can provide the radio device controller with information (that is, the clock synchronization information) for determining the clock synchronization accuracy of the radio device relative to the clock source, and the radio device controller can determine, based on the clock synchronization information, clock synchronization accuracy (that is, the first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

Figure 3:
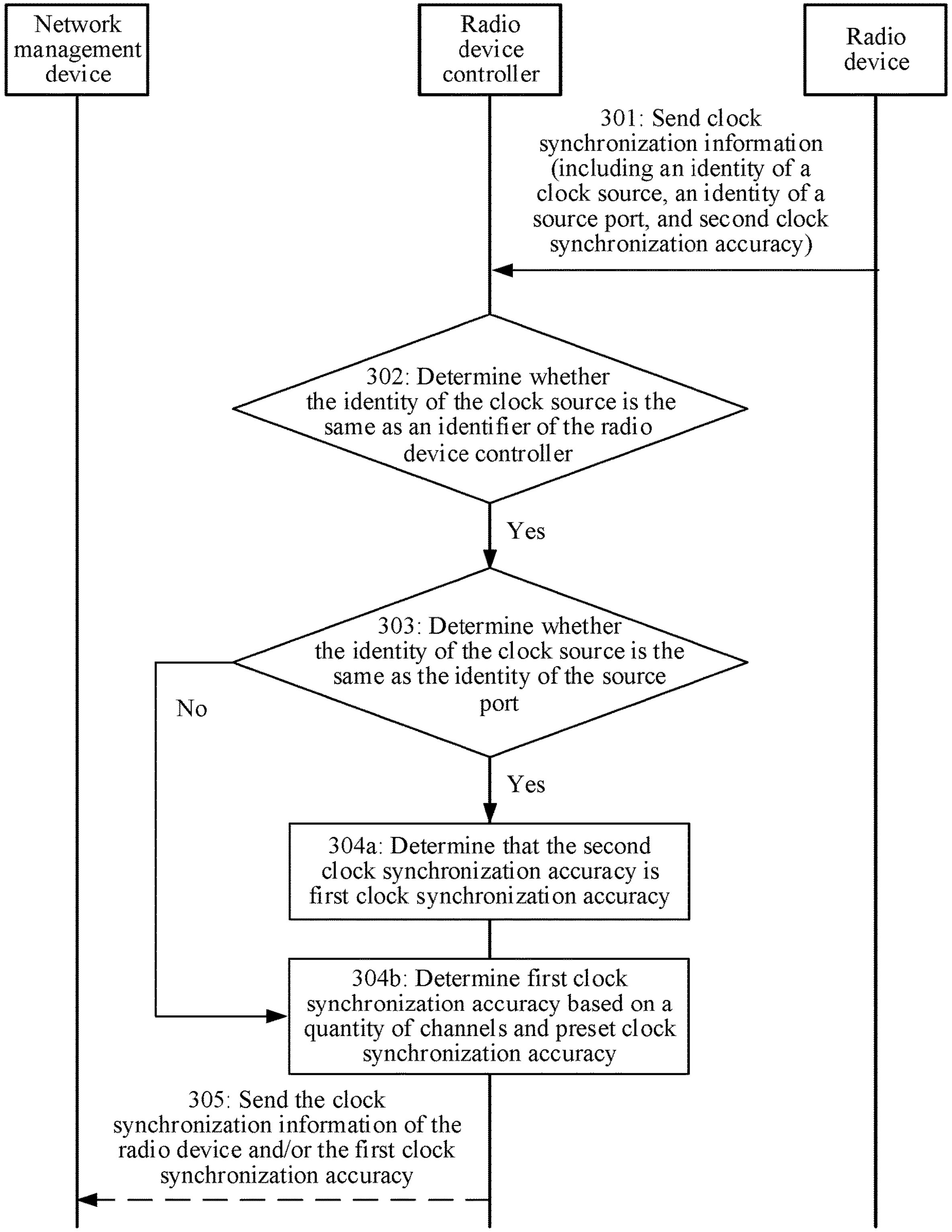
FIG. 3 is another flowchart of a clock synchronization information obtaining method according to this application.
Figure 4:
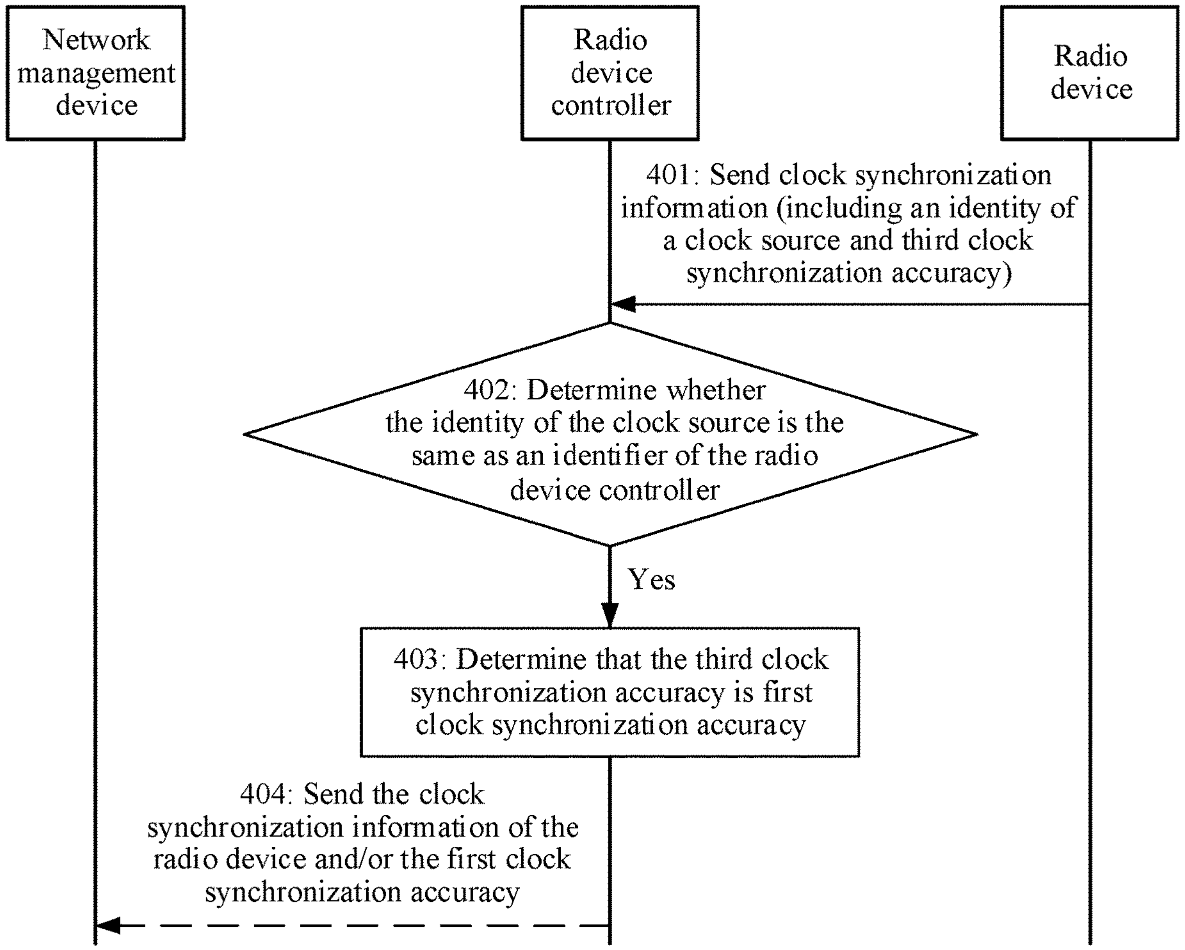
FIG. 4 is another flowchart of a clock synchronization information obtaining method according to this application.

For better understanding of the solutions provided in this application, the following describes, with reference to FIG. 3, an implementation in which the clock synchronization information includes at least the identity of the clock source, the identity of the source port, and the second clock synchronization accuracy, and describes, with reference to FIG. 4, an implementation in which the clock synchronization information includes at least the identity of the clock source and the third clock synchronization accuracy.

FIG. 3 shows an embodiment of a clock synchronization information obtaining method according to this application. A radio device and a radio device controller perform the following steps.

Step 301: The radio device sends clock synchronization information to the radio device controller.

The clock synchronization information includes an identity of a clock source and an identity of a source port. Optionally, the clock synchronization information further includes second clock synchronization accuracy.

The clock synchronization information indicates clock synchronization accuracy between the radio device and the clock source, which may be understood as that the clock synchronization information is information for determining the clock synchronization accuracy between the radio device and the clock source.

The clock source is a device that provides a reference time clock for a clock link on which the radio device is located. The reference time clock is a final reference for performing clock synchronization or clock calibration. Each device (including a transmission device and a radio device) on the clock link directly or indirectly uses a system clock of the clock source as a clock synchronization reference, and the clock link is a link for clock synchronization between the clock source and the radio device.

The identity of the clock source indicates the device that provides a reference time clock for the clock link on which the radio device is located, and the clock link is the link for clock synchronization between the clock source and the radio device. For example, the identity of the clock source may be a grandmaster clock identity (grandmasterIdentity) in the precision time protocol PTP.

The identity of the source port indicates an upper-level network device that is on the clock link and that provides clock synchronization for the radio device. It may also be understood as that the upper-level network device of the radio device is a network device directly connected to the radio device, and the radio device directly performs clock synchronization based on the upper-level network device. The upper-level network device of the radio device may be a transmission device connected to the radio device, or may be the radio device controller. For example, the identity of the source port may be sourcePortIdentity in the precision time protocol PTP.

In addition, the second clock synchronization accuracy is clock synchronization accuracy of the radio device relative to the upper-level network device of the radio device, that is, a fluctuation range of a difference between time (or a phase) of a system clock of the radio device and time (or a phase) of a system clock of the upper-level network device of the radio device. For example, the second clock synchronization accuracy may be referred to as local accuracy.

Optionally, the clock synchronization information further includes information about a quantity of communication channels on the clock link, and the communication channel is a channel between two directly connected network devices that can transmit clock information. For example, the information about the quantity of the communication channels may be represented by a value of stepsRemoved in the precision time protocol PTP plus 1.

Optionally, in addition to the foregoing content, a packet sent by the radio device to the radio device controller may further include an identifier of the radio device, where the identifier information of the radio device is for identifying the radio device, so that the radio device controller can distinguish the radio device from another radio device. For example, in the precision time protocol PTP, a clock identity (clockIdentity) may be for identifying the radio device.

Specifically, for descriptions of the identity of the clock source, the identity of the source port, the identifier of the radio device, the second clock synchronization accuracy, and the information about the quantity of the communication channels, refer to related descriptions in step 201. Details are not described herein again.

For example, if the clock synchronization information is sent in a management packet (for example, a management packet in the 1588 protocol), a format of the management packet may be shown in Table 1-1.

TABLE 1-1

| Fields included in a management packet | Byte quantity (Octets) | TLV offset |
|---|---|---|
| TLV type (TLV Type) | 2 | 0 |
| TLV length (TLV length) | 2 | 2 |
| Radio device identifier (clockIdentity) | 8 | 4 |
| Clock source identity (grandmasterIdentity) | 8 | 12 |
| Source port identity (sourcePortIdentity) | 10 | 20 |
| StepsRemoved | 2 | 30 |
| Local accuracy | 8 | 32 |

"TLV type" indicates a type of the management packet. In this application, a type of TLV indicates that the management packet is for transmitting the clock synchronization information. "TLV length" indicates a byte length occupied by the TLV.

It should be understood that, in actual application, if the radio device includes the clock synchronization information in another packet, a format of the packet carrying the clock synchronization information may not be limited to the fields listed in Table 1-1.

Step 302: The radio device controller determines whether the identity of the clock source is the same as an identifier of the radio device controller.

In this embodiment, after the radio device receives the clock synchronization information, the radio device controller needs to first learn whether the clock source of the radio device is the radio device controller. Specifically, the radio device controller determines whether the identity of the clock source is the same as the identifier of the radio device controller, to determine whether the clock source of the radio device is the radio device controller.

If the radio device controller determines that the identity of the clock source is the same as the identifier of the radio device controller, it indicates that the clock source of the radio device is the radio device controller, and indicates that the radio device controller can determine clock synchronization accuracy (that is, first clock synchronization accuracy) between the radio device and the radio device controller based on the clock synchronization information. Therefore, the radio device controller performs step 303.

Step 303: The radio device controller determines whether the identity of the clock source is the same as the identity of the source port.

In this embodiment, when the radio device controller determines that the identity of the clock source is the same as the identifier of the radio device controller, that is, when the radio device controller determines that the clock source of the radio device is the radio device controller, the radio device controller further needs to determine a topology (that is, information such as a quantity of transmission devices and a quantity of communication channels between the radio device and the radio device controller) of the clock link between the radio device and the radio device controller, and determine, based on the topology of the clock link, how to calculate the first clock synchronization accuracy.

Specifically, when the radio device controller determines that the identity of the clock source is the same as the identity of the source port, the radio device controller performs step 304*a*; or when the radio device controller determines that the identity of the clock source is different from the identity of the source port, the radio device controller performs step 304*b*.

Step 304*a*: The radio device controller determines that the second clock synchronization accuracy is the first clock synchronization accuracy.

In this embodiment, the identity of the clock source is the same as the identifier of the radio device controller, and the identity of the clock source is the same as the identity of the source port. Therefore, the radio device controller may determine that the radio device is directly connected to the radio device controller, the second clock synchronization accuracy carried in the clock synchronization information represents the clock synchronization accuracy (that is, the first clock synchronization accuracy) of the radio device relative to the radio device controller. Therefore, the radio device controller uses a value of the second clock synchronization accuracy in the clock synchronization information as a value of the first clock synchronization accuracy.

FIG. 1 is used as an example. For example, the radio device that sends the clock synchronization information is radio device 3, the radio device controller that receives the clock synchronization information is radio device controller 1, an identity of the clock source received by radio device controller 1 is an identifier of radio device controller 1, and an identity of the source port received by radio device controller 1 is an identifier of radio device controller 1. In this case, if clock synchronization accuracy, carried in the clock synchronization information, of radio device 3 relative to an upper-level network device of the radio device is 100 ns, radio device controller 1 determines that clock synchronization accuracy of radio device 3 relative to radio device controller 1 is 100 ns.

Step 304*b*: The radio device controller determines the first clock synchronization accuracy based on a quantity of channels and preset clock synchronization accuracy.

In this embodiment, if the identity of the clock source is different from the identity of the source port, it indicates that the upper-level network device of the radio device and the clock source are not a same device, and the radio device is connected to the clock source through at least one transmission device. The at least one transmission device includes the upper-level network device of the radio device.

In this case, the radio device controller needs to determine a topology of the clock link between the radio device and the radio device controller based on the information about the quantity of the communication channels, to estimate the clock synchronization accuracy (that is, the first clock synchronization accuracy) between the radio device and the radio device controller. The information about the quantity of the communication channels can reflect how many levels of clock synchronization need to be performed between the radio device and the radio device controller. If the radio device controller can estimate clock synchronization accuracy (referred to as clock synchronization accuracy of each level) between two network devices connected by each communication channel, the radio device controller may use an accumulated sum of synchronization accuracy of clock synchronization of each level as the clock synchronization accuracy (that is, the first clock synchronization accuracy) between the radio device and the radio device controller.

Optionally, the radio device controller stores the preset clock synchronization accuracy. The preset clock synchronization accuracy may be clock synchronization accuracy between two network devices that is predefined in a protocol or a standard. The preset clock synchronization accuracy may alternatively be an empirical value that is manually set in the radio device controller, indicating a possible value of clock synchronization accuracy between two network devices on the clock link.

For example, because the preset clock synchronization accuracy can be for estimating clock synchronization accuracy of each level of clock synchronization between the upper-level network device of the radio device and the radio device controller, and the second clock synchronization accuracy can be for determining the clock synchronization accuracy of the radio device relative to the upper-level network device of the radio device, the radio device controller may use the product obtained by multiplying the preset clock synchronization accuracy by the difference between the quantity of the communication channels and 1 as the clock synchronization accuracy between the upper-level network device of the radio device and the radio device controller. Then, the radio device controller uses a sum of the product and the second clock synchronization accuracy as the first clock synchronization accuracy.

FIG. 1 is used as an example. If the radio device that sends the clock synchronization information is radio device 1, and the radio device controller that receives the clock synchronization information is radio device controller 2, the identity of the clock source carried in the clock synchronization information is an identifier of radio device controller 2, the identity of the source port is an identifier of transmission device 3, and a value of the quantity of the communication channels is 3. If the second clock synchronization accuracy (that is, clock synchronization accuracy of radio device 1 relative to transmission device 3) is 40 ns, and the preset clock synchronization accuracy is 30 ns, the radio device controller can determine that the first clock synchronization accuracy is $(3-1)\times 30+40=100$ ns.

Step 305: The radio device controller sends the clock synchronization information of the radio device and/or the first clock synchronization accuracy to a network management device.

In this embodiment, step 305 is an optional step.

The network management device is a device for managing and maintaining the radio device and the radio device controller. The network management device is configured to identify a clock topology of an entire network based on the obtained information, to manage one or more radio device controllers based on the clock topology. Optionally, the network management device may further manage the transmission device, the radio device, and the like based on the clock topology.

In this embodiment, the radio device controller may send only the clock synchronization information of the radio device to the network management device, may send only the first clock synchronization accuracy to the network management device, or may send both the clock synchronization information and the first clock synchronization accuracy to the network management device. Therefore, the network management device may determine the clock link between the radio device and the radio device controller based on the clock synchronization information. If the network management device receives clock synchronization information of a plurality of radio devices, the network management device may determine a clock topology formed by a plurality of clock links. This helps the network management device manage, based on the clock links (or clock topology), a transmission device in the front-haul transport network or the radio device and the radio device controller that are connected by using the front-haul transport network, and helps improve management efficiency of managing the transmission device, the radio device, or the radio device controller by the network device.

In this embodiment, the radio device can provide, based on the clock synchronization information, the radio device controller with the clock synchronization accuracy (that is, the second clock synchronization accuracy) of the radio device relative to the upper-level network device of the radio device, and the radio device controller can determine, based on the second clock synchronization accuracy, the clock synchronization accuracy (that is, the first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

FIG. 4 shows another embodiment of a clock synchronization information obtaining method according to this application. A radio device and a radio device controller perform the following steps.

Step 401: The radio device sends clock synchronization information to the radio device controller.

The clock synchronization information includes an identity of a clock source and third clock synchronization accuracy.

The clock synchronization information indicates clock synchronization accuracy between the radio device and the clock source, which may be understood as that the clock synchronization information is information for determining the clock synchronization accuracy between the radio device and the clock source.

The clock source is a device that provides a reference time clock for a clock link on which the radio device is located. The reference time clock is a final reference for performing clock synchronization or clock calibration. Each device (including a transmission device and a radio device) on the clock link directly or indirectly uses a system clock of the clock source as a clock synchronization reference, and the clock link is a link for clock synchronization between the clock source and the radio device.

The identity of the clock source indicates the device that provides a reference time clock for the clock link on which the radio device is located, and the clock link is the link for clock synchronization between the clock source and the radio device. For example, the identity of the clock source may be a grandmaster clock identity (grandmasterIdentity) in the precision time protocol PTP.

In this case, the radio device can provide the radio device controller with the clock synchronization accuracy of the radio device relative to the clock source, that is, the third clock synchronization accuracy. If the clock source is the radio device controller that receives the clock synchronization information, a value of the third clock synchronization accuracy represents the clock synchronization accuracy (that is, the first clock synchronization accuracy) of the radio device relative to the radio device controller. For example, the third clock synchronization accuracy may be referred to as total accuracy.

Optionally, in addition to the foregoing content, a packet sent by the radio device to the radio device controller may further include an identifier of the radio device, where the identifier information of the radio device is for identifying the radio device, so that the radio device controller can distinguish the radio device from another radio device. For example, in the precision time protocol PTP, a clock identity (clockIdentity) may be for identifying the radio device.

For example, if the clock synchronization information is sent in a management packet (for example, a management packet in the 1588 protocol), a format of the management packet may be shown in Table 2-1.

TABLE 2-1

| Fields included in a management packet | Byte quantity (Octets) | TLV offset |
|---|---|---|
| TLV type (TLV Type) | 2 | 0 |
| TLV length (TLV length) | 2 | 2 |
| Radio device identifier (clockIdentity) | 8 | 4 |
| Clock source identity (grandmasterIdentity) | 8 | 12 |
| Total accuracy | 8 | 32 |

Step 402: The radio device controller determines whether the identity of the clock source is the same as an identifier of the radio device controller.

In this embodiment, after the radio device receives the clock synchronization information, the radio device controller needs to first learn whether the clock source of the radio device is the radio device controller. Specifically, the radio device controller determines whether the identity of the clock source is the same as the identifier of the radio device controller, to determine whether the clock source of the radio device is the radio device controller.

If the radio device controller determines that the identity of the clock source is the same as the identifier of the radio device controller, it indicates that the clock source of the radio device is the radio device controller, and indicates that the radio device controller can determine clock synchronization accuracy (that is, first clock synchronization accuracy) between the radio device and the radio device controller based on the clock synchronization information. Therefore, the radio device controller performs step 403.

Step 403: The radio device controller determines that the third clock synchronization accuracy is the first clock synchronization accuracy.

In this embodiment, because the identity of the clock source is the same as the identifier of the radio device controller, and the clock synchronization information carries only the clock synchronization accuracy (that is, the third clock synchronization accuracy) of the radio device relative to the clock source, the radio device controller can determine that the third clock synchronization accuracy carried in the clock synchronization information represents the clock synchronization accuracy (that is, the first clock synchronization accuracy) of the radio device relative to the radio device controller. Therefore, the radio device controller uses a value of the third clock synchronization accuracy in the clock synchronization information as a value of the first clock synchronization accuracy.

FIG. 1 is used as an example. If the radio device that sends the clock synchronization information is radio device 1, and the radio device controller that receives the clock synchronization information is radio device controller 2, the identity of the clock source carried in the clock synchronization information is an identifier of radio device controller 2. If the third clock synchronization accuracy (that is, clock synchronization accuracy of radio device 1 relative to radio device controller 2) is 130 ns, the radio device controller can determine that the first clock synchronization accuracy is 130 ns.

Step 404: The radio device controller sends the clock synchronization information of the radio device and/or the first clock synchronization accuracy to a network management device.

In this embodiment, step 404 is similar to step 305 in the embodiment corresponding to FIG. 3. For details, refer to related descriptions in step 305.

In this embodiment, because the radio device can directly provide the radio device controller with the clock synchronization accuracy (that is, the third clock synchronization accuracy) of the radio device relative to the clock source, when the clock source is the radio device controller that receives the clock synchronization information, the radio device controller can directly determine, based on the third clock synchronization accuracy, the clock synchronization accuracy (that is, the first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

Figure 5:
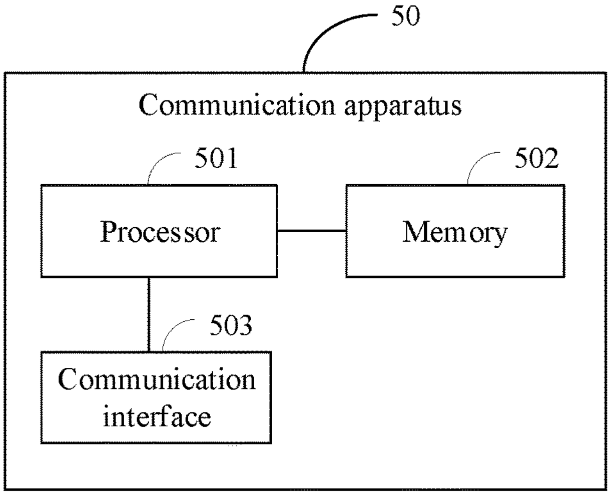
FIG. 5 is a schematic diagram of an embodiment of a communication apparatus according to this application.

FIG. 5 is a schematic diagram of a structure of a communication apparatus 50 according to this application. It should be understood that the radio device controller in the method embodiment corresponding to FIG. 2, FIG. 3, or FIG. 4 may be based on the structure of the communication apparatus 50 shown in FIG. 5 in this embodiment. The communication apparatus 50 may be a network element or a device having a baseband signal processing function, or a device having a function of managing radio signal processing of a radio access network RAN. For example, the communication apparatus 50 may be a baseband unit (BBU) (also referred to as a building baseband unit (BBU)) in a radio access network device (for example, a base station). For example, in a long term evolution LTE system or an LTE-advanced (LTE-A) system, the communication apparatus 50 may be a baseband unit BBU in an evolved NodeB (eNB or e-NodeB). For another example, in a 5G NR system, the communication apparatus 50 may be a baseband unit BBU in a next generation NodeB (gNB). For example, in the 5G NR system, the communication apparatus 50 may be a central unit (CU) in a cloud access network (Cloud-RAN), may be a distributed unit (DU), or may be a combination structure of a central unit CU and a distributed unit DU. In actual application and subsequent network evolution, the communication apparatus 50 may alternatively be another network element or device having a baseband signal processing function, or another device having a function of managing radio signal processing of a radio access network RAN.

Specifically, the communication apparatus 50 includes at least one processor 501, at least one memory 502, and at least one communication interface 503. The processor 501, the memory 502, and the communication interface 503 are connected by using a connection apparatus. The connection apparatus may include various types of interfaces, transmission cables, buses, or the like. This is not limited in this embodiment.

The memory 502 is mainly configured to store a software program and data. The memory 502 may exist independently, and is connected to the processor 501. Optionally, the memory 502 and the processor 501 may be integrated, for example, integrated into one or more chips. The memory 502 can store program code for executing the technical solutions in embodiments of this application, and the processor 501 controls the execution. Various types of executed computer program code may also be considered as drivers of the processor 501. It should be understood that FIG. 5 in this embodiment shows only one memory and one processor. However, in actual application, the communication apparatus 50 may have a plurality of processors or a plurality of memories. This is not specifically limited herein. In addition, the memory 502 may also be referred to as a storage medium, a storage device, or the like. The memory 502 may be a storage element located on a same chip as the processor, namely, an on-chip storage element, or may be an independent storage element. This is not limited in embodiments of this application.

In this embodiment, the communication interface 503 is configured to receive a digital baseband signal or a digital intermediate frequency signal from a radio frequency unit (for example, the radio device described above), and provide the digital baseband signal or the digital intermediate frequency signal to the processor 501, so that the processor 501 performs further processing, for example, demodulation processing and decoding processing, on the digital baseband signal or the digital intermediate frequency signal. The communication interface 503 may further send a digital baseband signal or a digital intermediate frequency signal to a radio frequency unit (for example, the radio device described above), so that the radio frequency unit converts the digital baseband signal or the digital intermediate frequency signal on which modulation is performed into a radio frequency signal, and sends the radio frequency signal by using one or more antennas.

Optionally, the communication interface 503 includes an enhanced common public radio interface (eCPRI). The communication apparatus 50 may send, through the eCPRI, a packet carrying clock synchronization information, for example, the 1588 management packet described above.

Optionally, the communication interface 503 is further connected to an optical module (not shown in the figure). The optical module is configured to convert a digital baseband signal generated by the communication apparatus 50 into an optical signal for transmission through an optical fiber. The optical module is further configured to receive an optical signal from another device (for example, the transmission device or the radio device described above), and convert the optical signal into a digital baseband signal.

It should be understood that a combination structure of the communication interface 503 and the optical module may also be referred to as a transceiver unit, a transceiver machine, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter machine, a transmitter, a transmitting circuit, or the like.

In addition, the processor 501 is mainly configured to process a communication protocol and communication data, control an entire network device, execute a software program, and process data of the software program, for example, configured to support the communication apparatus 50 in performing an action described in the foregoing embodiments. The communication apparatus 50 may include a baseband processor and a central processing unit.

The baseband processor is mainly configured to process a communication protocol and communication data. The central processing unit is mainly configured to control the entire communication apparatus 50, execute a software program, and process data of the software program. The processor 501 in FIG. 5 may integrate functions of the baseband processor and the central processing unit. A person skilled in the art may understand that, the baseband processor and the central processing unit may alternatively be independent processors, and are interconnected by using a bus or another technology. A person skilled in the art may understand that the communication apparatus 50 may include a plurality of baseband processors to adapt to different network standards, the communication apparatus 50 may include a plurality of central processing units to enhance a processing capability of the communication apparatus, and components of the communication apparatus 50 may be connected by using various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

Specifically, the communication apparatus 50 performs the following steps based on the program code stored in the memory 502:

The processor 501 receives clock synchronization information from a radio device through the communication interface 503, where the clock synchronization information indicates clock synchronization accuracy between the radio device and a clock source. Then, the processor 501 determines first clock synchronization accuracy based on the clock synchronization information, where the first clock synchronization accuracy is clock synchronization accuracy between the radio device and the radio device controller.

The clock synchronization accuracy refers to a fluctuation range of a difference between time (or a phase) of a measured clock and time (or a phase) of a reference clock. Usually, the clock synchronization accuracy may be represented by an average error value of time (or a phase) of the measured clock and time (or a phase) of the reference clock within a test metric. In this application, the clock synchronization accuracy is a fluctuation range of a difference between the radio device and a specific transmission device or a specific radio device controller in terms of time or a phase. It should be noted that, in some embodiments, the clock synchronization accuracy may also be referred to as synchronization accuracy or time synchronization accuracy.

That the clock synchronization information indicates the clock synchronization accuracy between the radio device and the clock source may be understood as that, the clock synchronization information is information for determining the clock synchronization accuracy between the radio device and the clock source. The radio device controller can determine the clock synchronization accuracy between the radio device and the clock source based on the clock synchronization information.

The clock source is a network device that provides a reference time clock for a clock link on which the radio device is located, and the clock link is a link for clock synchronization between the clock source and the radio device; and the reference time clock is a final reference for performing clock synchronization or clock calibration.

In a conventional technology, a radio device controller cannot learn which clock synchronization link is used by a radio device to perform synchronization, and cannot learn which network device is a clock source on a clock link on which the radio device performs clock accuracy of the radio device relative to the radio device controller, and further, the radio device controller cannot manage some services of the radio device based on the clock synchronization accuracy.

In this application, the radio device can provide, based on the clock synchronization information, the radio device controller with the clock synchronization accuracy of the radio device relative to the clock source, and the radio device controller can determine, based on the clock synchronization information, the clock synchronization accuracy (that is, first clock synchronization accuracy) of the radio device relative to the radio device controller. Therefore, this helps the radio device controller manage the radio device based on the first clock synchronization accuracy. In this way, the radio device controller can accurately determine clock synchronization accuracy between two radio devices, and the radio device controller can determine whether the two radio devices run a service that requires a collaborative operation.

Optionally, the radio device may be connected to the radio device controller through at least one clock information transmission device, or the radio device may be directly connected to the radio device controller. The clock information transmission device is a device configured to transmit information (referred to as clock information below) related to clock synchronization, and the clock information may include a part or all of the clock synchronization information. Usually, the at least one clock information transmission device is for connection through an optical fiber.

Optionally, the clock synchronization information is carried in a management message.

Optionally, the clock synchronization information is transmitted to the radio device controller in a unicast manner.

In an optional implementation, the processor 501 may further send the clock synchronization information of the radio device and/or the first clock synchronization accuracy to a network management device through the communication interface 503.

In a possible implementation, the clock synchronization information includes the identity of the clock source and the identity of the source port. The identity of the source port indicates an upper-level network device that is on the clock link and that provides clock synchronization for the radio device.

The identity of the clock source indicates the network device that provides the reference time clock for the clock link on which the radio device is located. The clock source is the network device that provides the reference time clock for the clock link on which the radio device is located. The reference time clock is a final reference for performing clock synchronization or clock calibration. Each device (including a transmission device and a radio device) on the clock link directly or indirectly uses a system clock of the clock source as a clock synchronization reference. The clock link is a link for clock synchronization between the clock source and the radio device.

It should be understood that the clock source in the clock synchronization information sent by the radio device to the communication apparatus 50 may be the communication apparatus 50 that receives the clock synchronization information, where in this case, the radio device and the communication apparatus 50 are located on a same clock synchronization link; may be a radio device controller on another clock link, where in this case, the radio device may perform clock synchronization through another clock link, and the clock link does not include the communication apparatus 50 that receives the clock synchronization information; or may be a network device that can provide a clock as a reference and that is on another link or topology. This is not specifically limited herein.

The identity of the source port indicates an upper-level network device that provides clock synchronization for the radio device on the clock link. The upper-level network device is a network device directly connected to the radio device, and the radio device directly performs clock synchronization based on the network device. Specifically, the upper-level network device may be a transmission device connected to the radio device, or may be the radio device controller.

Optionally, the clock synchronization information further includes second clock synchronization accuracy, and the second clock synchronization accuracy is clock synchronization accuracy of the radio device relative to the upper-level network device of the radio device.

The second clock synchronization accuracy is the clock synchronization accuracy of the radio device relative to the upper-level network device, that is, a fluctuation range of a difference between time (or a phase) of a system clock of the radio device and time (or a phase) of a system clock of the upper-level network device. For example, if the upper-level network device is a transmission device directly connected to the radio device, the second clock synchronization accuracy is clock synchronization accuracy of the radio device relative to the transmission device; or if the upper-level network device is the radio device controller directly connected to the radio device, the second clock synchronization accuracy is the clock synchronization accuracy of the radio device relative to the radio device controller.

Optionally, the clock synchronization information further includes an identifier of the radio device. The identifier of the radio device is for making clear, to the radio device controller, an identity of the radio device that sends the clock synchronization information, so that the communication apparatus 50 can determine, based on the identifier of the radio device, the radio device from which the clock synchronization information comes. When the communication apparatus 50 communicates with a plurality of radio devices, the identifier of the radio device can distinguish the radio device that sends the clock synchronization information from other radio devices.

Specifically, the processor 501 is configured to: when the identity of the clock source is the same as an identifier of the communication apparatus 50, and the identity of the clock source is the same as the identity of the source port, determine that the second clock synchronization accuracy is the first clock synchronization accuracy.

In this implementation, the identity of the clock source is the same as the identifier of the communication apparatus 50, and the identity of the clock source is the same as the identity of the source port. Therefore, the communication apparatus 50 may determine that the radio device is directly connected to the communication apparatus 50, that is, the radio device directly performs clock synchronization based on the clock source. Further, the communication apparatus 50 can determine that the second clock synchronization accuracy carried in the clock synchronization information represents the clock synchronization accuracy (that is, the first clock synchronization accuracy) of the radio device relative to the communication apparatus 50. Therefore, the communication apparatus 50 uses a value of the second clock synchronization accuracy in the clock synchronization information as a value of the first clock synchronization accuracy.

Optionally, the clock synchronization information further includes information about a quantity of communication channels on the clock link, and the communication channel is a channel between two directly connected network devices that can transmit clock information. The clock information is information related to clock synchronization, and content of the clock information may include a part or all of the clock synchronization information.

Specifically, the processor 501 is configured to: when the identity of the clock source is the same as an identifier of the radio device controller, and the identity of the clock source is different from the identity of the source port, determine the first clock synchronization accuracy based on the information about the quantity of the communication channels, the second clock synchronization accuracy, and preset clock synchronization accuracy.

Further, the processor 501 is specifically configured to: determine a product obtained by multiplying the preset clock synchronization accuracy by a difference between the quantity of the communication channels and 1; and determine that a sum of the product and the second clock synchronization accuracy is the first clock synchronization accuracy.

The preset clock synchronization accuracy may be clock synchronization accuracy between two network devices predefined in a protocol or a standard, or may be an empirical value that is manually set in the radio device controller, indicating a possible value of clock synchronization accuracy between two network devices on the clock link. It should be understood that, in addition to being for estimating clock synchronization accuracy between two transmission devices, the preset clock synchronization accuracy may be further for estimating clock synchronization accuracy of a transmission device relative to a radio device controller directly connected to the transmission device.

In another possible implementation, the clock synchronization information includes an identity of the clock source and third clock synchronization accuracy, and the third clock synchronization accuracy is the clock synchronization accuracy of the radio device relative to the clock source. Optionally, the clock synchronization information further includes an identifier of the radio device.

Specifically, the processor 501 is configured to: when the identity of the clock source is the same as an identifier of the radio device controller, determine that the third clock synchronization accuracy is the first clock synchronization accuracy.

In a possible implementation, the processor 501 is further configured to send the clock synchronization information of the radio device and/or the first clock synchronization accuracy to a network management device.

In a possible implementation, the radio device includes a first radio device and a second radio device.

The processor 501 determines fourth clock synchronization accuracy based on the clock synchronization information received from the first radio device, and the processor 501 determines fifth clock synchronization accuracy based on the clock synchronization information received from the second radio device. The fourth clock synchronization accuracy is clock synchronization accuracy between the first radio device and the communication apparatus 50, and the fifth clock synchronization accuracy is clock synchronization accuracy between the second radio device and the communication apparatus 50.

The processor 501 is further configured to determine sixth clock synchronization accuracy based on the fourth clock synchronization accuracy and the fifth clock synchronization accuracy, where the sixth clock synchronization accuracy is clock synchronization accuracy between the first radio device and the second radio device. The processor 501 is further configured to determine, based on the sixth clock synchronization accuracy, whether the first radio device and the second radio device are allowed to run a first service in collaboration, where the first service is a service on which a collaboration operation needs to be performed by two or more radio devices. For example, the first service may be a service related to a multiple-input multiple-output MIMO technology or a service related to carrier aggregation CA.

In a possible implementation, the processor 501 is specifically configured to calculate a sum of the fourth clock synchronization accuracy and the fifth clock synchronization accuracy, to obtain the sixth clock synchronization accuracy.

In a possible implementation, the processor 501 is specifically configured to:

when the sixth clock synchronization accuracy is less than clock synchronization accuracy corresponding to the first service, determine to allow the first radio device and the second radio device to run the first service in collaboration; and when the sixth clock synchronization accuracy is greater than the clock synchronization accuracy corresponding to the first service, determine not to allow the first radio device and the second radio device to run the first service in collaboration.

For the rest, refer to the method of the radio device controller in the embodiment corresponding to FIG. 2, FIG. 3, or FIG. 4. Details are not described herein again.

Figure 6:
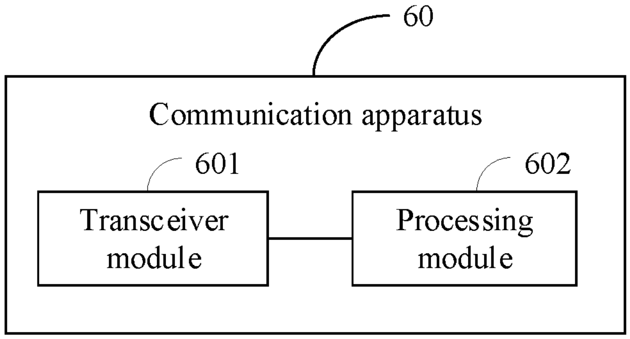
FIG. 6 is a schematic diagram of another embodiment of a communication apparatus according to this application.

As shown in FIG. 6, this application further provides another communication apparatus 60. The communication apparatus 60 may be the radio device controller in the embodiment corresponding to FIG. 2, FIG. 3, or FIG. 4 or a chip in the radio device controller. The communication apparatus 60 includes a transceiver module 601 and a processing module 602.

Specifically, the transceiver module 601 is configured to receive clock synchronization information from a radio device, where the clock synchronization information indicates clock synchronization accuracy between the radio device and a clock source. The processing module 602 is configured to determine first clock synchronization accuracy based on the clock synchronization information where the first clock synchronization accuracy is clock synchronization accuracy between the radio device and the radio device controller.

The clock source is a network device that provides a reference time clock for a clock link on which the radio device is located, and the clock link is a link for clock synchronization between the clock source and the radio device; and the reference time clock is a final reference for performing clock synchronization or clock calibration.

Optionally, the radio device is connected to the radio device controller by using at least one clock information transmission device.

Optionally, the clock synchronization information is carried in a management message.

Optionally, the clock synchronization information is transmitted to the radio device controller in a unicast manner.

In an optional implementation, the transceiver module 601 is further configured to send the clock synchronization information of the radio device and/or the first clock synchronization accuracy to a network management device.

In a possible implementation, the clock synchronization information includes an identity of the clock source, an identity of a source port, and second clock synchronization accuracy. The identity of the source port indicates an upper-level network device that is on the clock link and that provides clock synchronization for the radio device. The second clock synchronization accuracy is clock synchronization accuracy of the radio device relative to the upper-level network device of the radio device. Optionally, the clock synchronization information further includes an identifier of the radio device.

Specifically, the processing module 602 is configured to: when the identity of the clock source is the same as an identifier of the radio device controller, and the identity of the clock source is the same as the identity of the source port, determine that the second clock synchronization accuracy is the first clock synchronization accuracy.

Optionally, the clock synchronization information further includes information about a quantity of communication channels on the clock link, and the communication channel is a channel between two directly connected network devices that can transmit clock information.

Specifically, the processing module 602 is configured to: when the identity of the clock source is the same as an identifier of the radio device controller, and the identity of the clock source is different from the identity of the source port, determine the first clock synchronization accuracy based on the information about the quantity of the communication channels, the second clock synchronization accuracy, and preset clock synchronization accuracy.

Further, the processing module 602 is configured to: determine a product obtained by multiplying the preset clock synchronization accuracy by a difference between the quantity of the communication channels and 1; and determine that a sum of the product and the second clock synchronization accuracy is the first clock synchronization accuracy.

In another possible implementation, the clock synchronization information includes an identity of the clock source and third clock synchronization accuracy, and the third clock synchronization accuracy is the clock synchronization accuracy of the radio device relative to the clock source. Optionally, the clock synchronization information further includes an identifier of the radio device.

Specifically, the processing module 602 is configured to: when the identity of the clock source is the same as an identifier of the radio device controller, determine that the third clock synchronization accuracy is the first clock synchronization accuracy.

In a possible implementation, the processing module 602 is further configured to send the clock synchronization information of the radio device and/or the first clock synchronization accuracy to a network management device.

In a possible implementation, the radio device includes a first radio device and a second radio device.

The processing module 602 determines fourth clock synchronization accuracy based on the clock synchronization information received from the first radio device, and the processing module 602 determines fifth clock synchronization accuracy based on the clock synchronization information received from the second radio device. The fourth clock synchronization accuracy is clock synchronization accuracy between the first radio device and the communication apparatus 60, and the fifth clock synchronization accuracy is clock synchronization accuracy between the second radio device and the communication apparatus 60.

The processing module 602 is further configured to determine sixth clock synchronization accuracy based on the fourth clock synchronization accuracy and the fifth clock synchronization accuracy, where the sixth clock synchronization accuracy is clock synchronization accuracy between the first radio device and the second radio device. The processing module 602 is further configured to determine, based on the sixth clock synchronization accuracy, whether the first radio device and the second radio device are allowed to run a first service in collaboration, where the first service is a service on which a collaboration operation needs to be performed by two or more radio devices.

In a possible implementation, the processing module 602 is specifically configured to calculate a sum of the fourth clock synchronization accuracy and the fifth clock synchronization accuracy, to obtain the sixth clock synchronization accuracy.

In a possible implementation, the processing module 602 is specifically configured to:

when the sixth clock synchronization accuracy is less than clock synchronization accuracy corresponding to the first service, determine to allow the first radio device and the second radio device to run the first service in collaboration; and when the sixth clock synchronization accuracy is greater than the clock synchronization accuracy corresponding to the first service, determine not to allow the first radio device and the second radio device to run the first service in collaboration.

For the rest, refer to the method of the radio device controller in the embodiment corresponding to FIG. 2, FIG. 3, or FIG. 4. Details are not described herein again.

Figure 7:
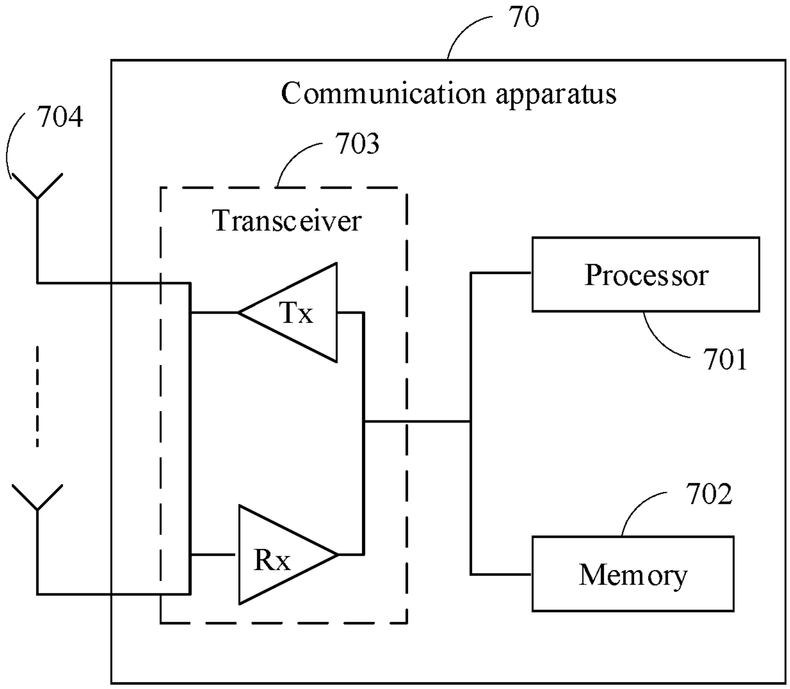
FIG. 7 is a schematic diagram of another embodiment of a communication apparatus according to this application.

FIG. 7 is a schematic diagram of a structure of another communication apparatus 70 according to this application. It should be understood that the radio device in the method embodiment corresponding to FIG. 2, FIG. 3, or FIG. 4 may be based on the structure of the communication apparatus 70 shown in FIG. 7 in this embodiment. It should be understood that the communication apparatus 70 may be a radio unit (RU) (also referred to as a radio frequency unit) in a radio access network RAN device (for example, a base station), or may be another processing apparatus having a function of processing a radio signal (for example, an intermediate frequency signal or a radio frequency signal). For example, the communication apparatus 70 may be a remote radio unit (RRU) (also referred to as a remote radio unit) or a remote radio head (RRH) in a base station. The RRU is usually for conventional outdoor coverage of a macro base station, and the RRH is usually for indoor coverage of an indoor distributed system. For example, in a 5G NR system, the communication apparatus 70 may alternatively be an active antenna unit (AAU), that is, a processing unit that integrates an RRU (or an RRH) and an antenna. In an actual application and subsequent network evolution, the radio device may alternatively be another device or apparatus that has functions of receiving and sending a radio frequency signal and processing a radio frequency signal or an intermediate frequency signal.

The communication apparatus 70 includes at least one processor 701, at least one memory 702, at least one transceiver 703, and one or more antennas 704. The processor 701, the memory 702, and the transceiver 703 are connected by using a connection apparatus, and the antenna 704 is connected to the transceiver 703. The connection apparatus may include various types of interfaces, transmission cables, buses, or the like. This is not limited in this embodiment.

The memory 702 is mainly configured to store a software program and data. The memory 702 may exist independently, and is connected to the processor 701. Optionally, the memory 702 and the processor 701 may be integrated, for example, integrated into one or more chips. The memory 702 can store program code for executing the technical solutions in embodiments of this application, and the processor 701 controls the execution. Various types of executed computer program code may also be considered as drivers of the processor 701. It should be understood that FIG. 7 in this embodiment shows only one memory and one processor. However, in actual application, the communication apparatus 70 may have a plurality of processors or a plurality of memories. This is not specifically limited herein. In addition, the memory 702 may also be referred to as a storage medium, a storage device, or the like. The memory 702 may be a storage element located on a same chip as the processor, namely, an on-chip storage element, or may be an independent storage element. This is not limited in embodiments of this application.

In this embodiment, the transceiver 703 may be configured to support receiving or sending of a radio frequency signal between the communication apparatus 70 and a terminal device, and the transceiver 703 may be connected to the antenna 704. The transceiver 703 includes a transmitter Tx and a receiver Rx. Specifically, one or more antennas 704 may receive a radio frequency signal. The receiver Rx of the transceiver 703 is configured to receive the radio frequency signal from the antenna 704, and convert the radio frequency signal into a digital baseband signal or a digital intermediate frequency signal, so that the digital baseband signal or the digital intermediate frequency signal is transmitted to a radio device controller, so that the radio device controller performs further processing, for example, demodulation processing and decoding processing, on the digital baseband signal or the digital intermediate frequency signal. In addition, the transmitter Tx of the transceiver 703 is further configured to receive a modulated digital baseband signal or a modulated digital intermediate frequency signal from the radio device controller, convert the modulated digital baseband signal or the modulated digital intermediate frequency signal into a radio frequency signal, and send the radio frequency signal by using the one or more antennas 704. Specifically, the receiver Rx may selectively perform one-level or multi-level down frequency mixing processing and analog-to-digital conversion processing on the radio frequency signal to obtain a digital baseband signal or a digital intermediate frequency signal, and a sequence of the down frequency mixing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

It should be understood that the transceiver 703 may also be referred to as a transceiver unit, a transceiver machine, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like.

In addition, the processor 701 is mainly configured to process a communication protocol (for example, a clock synchronization protocol) and communication data, execute a software program, and process data of the software program, for example, configured to support the communication apparatus 70 in performing an action described in the foregoing embodiments. In a possible implementation, the communication apparatus 70 is configured to perform the method in the embodiment corresponding to FIG. 2, FIG. 3, or FIG. 4.

Specifically, the communication apparatus 70 sends clock synchronization information to the radio device controller by using the transceiver 703, where the clock synchronization information indicates clock synchronization accuracy between the radio device and a clock source, the clock synchronization information is for determining first clock synchronization accuracy, and the first clock synchronization accuracy is clock synchronization accuracy between the radio device and the radio device controller.

The clock synchronization accuracy refers to a fluctuation range of a difference between time (or a phase) of a measured clock and time (or a phase) of a reference clock. Usually, the clock synchronization accuracy may be represented by an average error value of time (or a phase) of the measured clock and time (or a phase) of the reference clock within a test metric. In this application, the clock synchronization accuracy is a fluctuation range of a difference between the radio device and a specific transmission device or a specific radio device controller in terms of time or a phase. It should be noted that, in some embodiments, the clock synchronization accuracy may also be referred to as synchronization accuracy or time synchronization accuracy.

That the clock synchronization information indicates the clock synchronization accuracy between the radio device and the clock source may be understood as that, the clock synchronization information is information for determining the clock synchronization accuracy between the radio device and the clock source. The radio device controller can determine the clock synchronization accuracy between the radio device and the clock source based on the clock synchronization information.

The clock source is a network device that provides a reference time clock for a clock link on which the radio device is located, and the clock link is a link for clock synchronization between the clock source and the radio device; and the reference time clock is a final reference for performing clock synchronization or clock calibration.

Optionally, the radio device is connected to the radio device controller by using at least one clock information transmission device.

Optionally, the clock synchronization information is carried in a management message.

Optionally, the clock synchronization information is transmitted to the radio device controller in a unicast manner.

In a possible implementation, the clock synchronization information includes an identity of the clock source, an identity of a source port, and second clock synchronization accuracy. The identity of the source port indicates an upper-level network device that is on the clock link and that provides clock synchronization for the radio device. The second clock synchronization accuracy is clock synchronization accuracy of the radio device relative to the upper-level network device of the radio device.

Optionally, the clock synchronization information further includes an identifier of the radio device.

Optionally, the clock synchronization information further includes information about a quantity of communication channels on the clock link, and the communication channel is a channel between two directly connected network devices that can transmit clock information.

In another possible implementation, the clock synchronization information includes an identity of the clock source and third clock synchronization accuracy, and the third clock synchronization accuracy is the clock synchronization accuracy of the radio device relative to the clock source.

For the rest, refer to the method of the radio device in the embodiment corresponding to FIG. 2, FIG. 3, or FIG. 4. Details are not described herein again.

Figure 8:
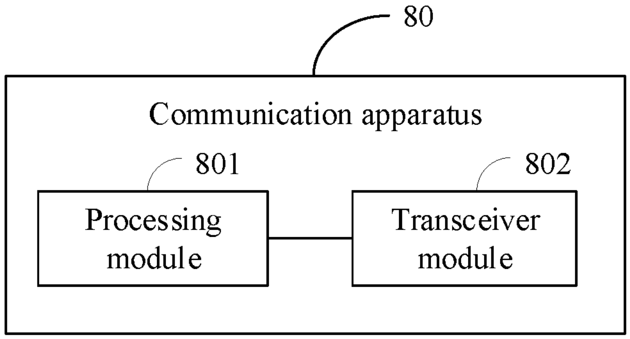
FIG. 8 is a schematic diagram of another embodiment of a communication apparatus according to this application.

As shown in FIG. 8, this application further provides another communication apparatus 80. The communication apparatus 80 may be the radio device in the embodiment corresponding to FIG. 2, FIG. 3, or FIG. 4 or a chip in the radio device. The communication apparatus 80 includes a processing module 801 and a transceiver module 802.

Specifically, the processing module 801 is configured to generate clock synchronization information, where the clock synchronization information indicates clock synchronization accuracy between the radio device and a clock source. The transceiver module 802 is configured to send the clock synchronization information to a radio device controller, where the clock synchronization information is for determining first clock synchronization accuracy, and the first clock synchronization accuracy is clock synchronization accuracy between the radio device and the radio device controller. The clock source is a network device that provides a reference time clock for a clock link on which the radio device is located, and the clock link is a link for clock synchronization between the clock source and the radio device; and the reference time clock is a final reference for performing clock synchronization or clock calibration.

Optionally, the radio device is connected to the radio device controller by using at least one clock information transmission device.

Optionally, the clock synchronization information is carried in a management message.

Optionally, the clock synchronization information is transmitted to the radio device controller in a unicast manner.

In a possible implementation, the clock synchronization information includes an identity of the clock source, an identity of a source port, and second clock synchronization accuracy. The identity of the source port indicates an upper-level network device that is on the clock link and that provides clock synchronization for the radio device. The second clock synchronization accuracy is clock synchronization accuracy of the radio device relative to the upper-level network device of the radio device.

Optionally, the clock synchronization information further includes an identifier of the radio device.

Optionally, the clock synchronization information further includes information about a quantity of communication channels on the clock link, and the communication channel is a channel between two directly connected transmission devices that can transmit clock information.

In another possible implementation, the clock synchronization information includes an identity of the clock source and third clock synchronization accuracy, and the third clock synchronization accuracy is the clock synchronization accuracy of the radio device relative to the clock source.

For the rest, refer to the method of the radio device in the embodiment corresponding to FIG. 2, FIG. 3, or FIG. 4. Details are not described herein again.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again. It should be further understood that, "first", "second", "third", "fourth", and various numbers in this specification are merely used for differentiation for ease of description, and are not intended to limit the scope of embodiments of this application.

In addition, this application provides a computer program product. The computer program product includes one or more computer instructions. When the computer program instructions are loaded and executed on a computer, the procedures or functions according to embodiments of this application are all or partially generated. For example, the method related to the radio device controller in FIG. 2, FIG. 3, or FIG. 4 is implemented. For another example, the method related to the radio device in FIG. 2, FIG. 3, or FIG. 4 is implemented. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In addition, this application further provides a computer-readable storage medium. The storage medium stores a computer program, and the computer program is executed by a processor to implement the method related to the radio device controller in FIG. 2, FIG. 3, or FIG. 4.

In addition, this application further provides a computer-readable storage medium. The storage medium stores a computer program, and the computer program is executed by a processor to implement the method related to the radio device in FIG. 2, FIG. 3, or FIG. 4.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A method performed by a radio device controller, comprising:

receiving clock synchronization information from a radio device, wherein the clock synchronization information indicates clock synchronization accuracy between the radio device and a clock source, the clock source is a network device that provides a reference time clock for a clock link, and the clock link is a link for clock synchronization between the clock source and the radio device, wherein the clock synchronization information comprises an identity of the clock source, an identity of a source port, and second clock synchronization accuracy, wherein the identity of the source port indicates an upper-level network device that is on the clock link and that provides clock synchronization for the radio device, and the second clock synchronization accuracy is clock synchronization accuracy of the radio device relative to the upper-level network device; and determining, based on the clock synchronization information, first clock synchronization accuracy between the radio device and the radio device controller.

2. The method of claim 1, wherein the radio device is connected to the radio device controller through at least one clock information transmission device, or the radio device is directly connected to the radio device controller.

3. The method of claim 1, wherein the determining the first clock synchronization accuracy based on the information about the quantity of the communication channels, the second clock synchronization accuracy, and preset clock synchronization accuracy comprises:

determining a product obtained by multiplying the preset clock synchronization accuracy by a difference between the quantity of the communication channels and 1; and determining that a sum of the product and the second clock synchronization accuracy is the first clock synchronization accuracy.

4. The method of claim 1, wherein the determining, based on the clock synchronization information, the first clock synchronization accuracy comprises:

determining the second clock synchronization accuracy as the first clock synchronization accuracy when the identity of the clock source is the same as an identifier of the radio device controller, and the identity of the clock source is the same as the identity of the source port.

5. The method of claim 1, wherein the clock synchronization information further comprises information about a quantity of communication channels on the clock link, and the communication channel is a channel between two directly connected network devices that is capable of transmitting clock information.

6. The method of claim 1, wherein the determining, based on the clock synchronization information, first clock synchronization accuracy comprises:

when the identity of the clock source is the same as an identifier of the radio device controller, and the identity of the clock source is different from the identity of the source port, determining the first clock synchronization accuracy based on the information about the quantity of the communication channels, the second clock synchronization accuracy, and preset clock synchronization accuracy.

7. The method of claim 1, wherein the clock synchronization information comprises an identity of the clock source and third clock synchronization accuracy, and the third clock synchronization accuracy is the clock synchronization accuracy of the radio device relative to the clock source.

8. The method of claim 7, wherein the determining, based on the clock synchronization information, the first clock synchronization accuracy comprises:

when the identity of the clock source is the same as an identifier of the radio device controller, determining the third clock synchronization accuracy as the first clock synchronization accuracy.

9. A method performed by a radio device, comprising:

sending clock synchronization information to a radio device controller, wherein the clock synchronization information indicates clock synchronization accuracy between the radio device and a clock source, the clock source is a network device that provides a reference time clock for a clock link, the clock link is a link for clock synchronization between the clock source and the radio device, the clock synchronization information is for determining first clock synchronization accuracy between the radio device and the radio device controller, wherein the clock synchronization information comprises an identity of the clock source, an identity of a source port, and second clock synchronization accuracy, wherein the identity of the source port indicates an upper-level network device that is on the clock link and that provides clock synchronization for the radio device, and the second clock synchronization accuracy is clock synchronization accuracy of the radio device relative to the upper-level network device.

10. The method of claim 9, wherein the radio device is connected to the radio device controller through at least one clock information transmission device, or the radio device is directly connected to the radio device controller.

11. A communication system, comprising a radio device and a radio device controller, wherein:

the radio device is configured to send clock synchronization information to the radio device controller, wherein the clock synchronization information indicates clock synchronization accuracy between the radio device and a clock source, the clock source is a network device that provides a reference time clock for a clock link, and the clock link is a link for clock synchronization between the clock source and the radio device, wherein the clock synchronization information comprises an identity of the clock source, an identity of a source port, and second clock synchronization accuracy, wherein the identity of the source port indicates an upper-level network device that is on the clock link and that provides clock synchronization for the radio device, and the second clock synchronization accuracy is clock synchronization accuracy of the radio device relative to the upper-level network device; and the radio device controller is configured to:

receive the clock synchronization information from the radio device; and determine, based on the clock synchronization information, first clock synchronization accuracy between the radio device and the radio device controller.

12. The communication system of claim 11, wherein the radio device is connected to the radio device controller through at least one clock information transmission device, or the radio device is directly connected to the radio device controller.

13. The communication system of claim 11, wherein the clock synchronization information comprises an identity of the clock source and third clock synchronization accuracy, and the third clock synchronization accuracy is the clock synchronization accuracy of the radio device relative to the clock source.

14. The communication system of claim 13, wherein the radio device controller is configured to:

when the identity of the clock source is the same as an identifier of the radio device controller, determine the third clock synchronization accuracy as the first clock synchronization accuracy.

15. The communication system of claim 11, wherein the radio device controller is configured to:

when the identity of the clock source is the same as an identifier of the radio device controller, and the identity of the clock source is the same as the identity of the source port, determine the second clock synchronization accuracy as the first clock synchronization accuracy.

16. The communication system of claim 11, wherein the clock synchronization information further comprises information about a quantity of communication channels on the clock link, and the communication channel is a channel between two directly connected network devices that is capable of transmitting clock information.

17. The communication system of claim 11, wherein the radio device controller is configured to:

when the identity of the clock source is the same as an identifier of the radio device controller, and the identity of the clock source is different from the identity of the source port, determine the first clock synchronization accuracy based on the information about the quantity of the communication channels, the second clock synchronization accuracy, and preset clock synchronization accuracy.

18. The communication system of claim 11, wherein the radio device controller is configured to:

determine a product obtained by multiplying the preset clock synchronization accuracy by a difference between the quantity of the communication channels and 1; and determine that a sum of the product and the second clock synchronization accuracy is the first clock synchronization accuracy.

19. An apparatus, comprising:

a memory; and a processor coupled to the memory and configured to execute program instructions stored in the memory to cause the apparatus to:

receive clock synchronization information from a radio device, wherein the clock synchronization information indicates clock synchronization accuracy between the radio device and a clock source, the clock source is a network device that provides a reference time clock for a clock link, and the clock link is a link for clock synchronization between the clock source and the radio device, wherein the clock synchronization information comprises an identity of the clock source, an identity of a source port, and second clock synchronization accuracy, wherein the identity of the source port indicates an upper-level network device that is on the clock link and that provides clock synchronization for the radio device, and the second clock synchronization accuracy is clock synchronization accuracy of the radio device relative to the upper-level network device; and determine, based on the clock synchronization information, first clock synchronization accuracy between the radio device and the apparatus.

20. The apparatus of claim 19, wherein the clock synchronization information further comprises information about a quantity of communication channels on the clock link, and the communication channel is a channel between two directly connected network devices that is capable of transmitting clock information.

* * * * *